(12) United States Patent
Walls et al.

(10) Patent No.: US 12,539,232 B2
(45) Date of Patent: Feb. 3, 2026

(54) TEMPERATURE MANAGEMENT CASE REVIEW PERFORMANCE AND TREATMENT ANALYSIS

(71) Applicant: ZOLL Circulation, Inc., San Jose, CA (US)

(72) Inventors: George Walls, San Jose, CA (US); Roland Krause, San Jose, CA (US); Jeremy Dabrowiak, San Jose, CA (US)

(73) Assignee: ZOLL Circulation, Inc., San Jose, CA (US)

( * ) Notice: Subject to any disclaimer, the term of this patent is extended or adjusted under 35 U.S.C. 154(b) by 376 days.

(21) Appl. No.: 18/128,483

(22) Filed: Mar. 30, 2023

(65) Prior Publication Data
US 2023/0310208 A1 Oct. 5, 2023

Related U.S. Application Data

(60) Provisional application No. 63/325,457, filed on Mar. 30, 2022.

(51) Int. Cl.
| | | |
|---|---|---|
| *A61F 7/12* | (2006.01) | |
| *A61B 5/00* | (2006.01) | |
| *A61F 7/00* | (2006.01) | |

(52) U.S. Cl.
CPC ............. *A61F 7/12* (2013.01); *A61B 5/7264* (2013.01); *A61B 5/743* (2013.01); *A61F 7/0097* (2013.01); *A61F 2007/0093* (2013.01); *A61F 2007/0095* (2013.01); *A61F 2007/126* (2013.01)

(58) Field of Classification Search
CPC ......... A61B 5/743; A61B 5/7435; A61F 7/12; A61F 7/0097
See application file for complete search history.

(56) References Cited

U.S. PATENT DOCUMENTS

| | | |
|---|---|---|
| 9,566,185 B2 | 2/2017 | Carson et al. |
| 9,763,823 B2 | 9/2017 | Voorhees et al. |
| 10,568,760 B2 | 2/2020 | Paradis |
| 11,116,656 B2 | 9/2021 | Taylor et al. |
| 11,123,221 B2 | 9/2021 | Dabrowiak et al. |

(Continued)

OTHER PUBLICATIONS

Matthews et al., "Analysis of serial measurements in medical research." British Medical Journal,1990, 300:230-235.

(Continued)

*Primary Examiner* — Alireza Nia
(74) *Attorney, Agent, or Firm* — Finch & Maloney PLLC

(57) ABSTRACT

In some implementations, data obtained by a temperature management system for delivering temperature management therapy to a patient is presented, within a single display region, as a graph of patient temperature over time representing the timespans of all phases of a multi-phase temperature management therapy. The graph may be fitted to present each phase separately in a manner that retains data complexity. The graph may include power data representing power output over time by a temperature management device. Data from other devices may be incorporated into the graph. A portion of the data may be patient temperature data and/or patient physiological data gathered during a time preceding temperature management therapy by the temperature management device.

18 Claims, 18 Drawing Sheets

(56) References Cited

U.S. PATENT DOCUMENTS

| | | | |
|---|---|---|---|
| 2009/0099629 A1* | 4/2009 | Carson | A61F 7/0085 |
| | | | 607/96 |
| 2017/0228900 A1* | 8/2017 | Okabe | G16H 10/60 |
| 2017/0348145 A1* | 12/2017 | Voorhees | A61B 5/6828 |
| 2019/0151143 A1* | 5/2019 | Dabrowiak | A61F 7/12 |
| 2019/0192339 A1* | 6/2019 | Taylor | A61B 5/4836 |
| 2020/0405529 A1 | 12/2020 | Taylor et al. | |
| 2020/0405530 A1 | 12/2020 | Taylor et al. | |
| 2021/0401616 A1 | 12/2021 | Taylor et al. | |
| 2022/0313481 A1 | 10/2022 | Dabrowiak et al. | |

OTHER PUBLICATIONS

Vargas et al., "Evaluation of the antipyretic effect of ketorolac, acetaminophen, and placebo in endotoxin-induced fever," The Journal of Clinical Pharmacology, 1994, 34:848-853.

Diringer, "Treatment of fever in the neurologic intensive care unit with a catheter-based heat exchange system," Critical Care Medicine, 2004, 32.2:559-564.

* cited by examiner

FIG. 5A

| Case Histories | | | | | Upload |
|---|---|---|---|---|---|
| 504a 506a 508a 514a 522a 530a 528a 526a | | | | | 502a |
| "36°C COOLING" FIRST TARGET | Case ID: 23243543<br>Door to Initiation Time<br>70 min 510a | 03/25/21, 05:45PM<br>ROSC<br>34min 512a | Application: Cardiac Arrest<br>Time to target<br>75min 516a | Cooling rate<br>2.8°C/h ▬▬▬<br>518a | Patient outcome Case status<br>Survived 520 Not verified |
| "33°C WARMING" FIRST TARGET | Case ID: 23243544<br>Door to Initiation Time<br>48 min | 03/28/21, 02:40PM<br>ROSC<br>34min | Application: Cardiac Arrest<br>Time to target<br>75min | Warming rate<br>1.8°C/h ▬▬▬ | Patient outcome Case status<br>Survived Not verified | 502b |
| "36.5°C NORMO THERMIA" FIRST TARGET | Case ID: 23243545<br>Target temp<br>36.5°C | 03/29/21, 07:19AM<br>Time to target<br>75min | Application: Cardiac Arrest<br>Time within range<br>98% (±0.5°C) 524 | | Patient outcome Case status<br>Survived Not verified | 502c |
| "36°C COOLING" FIRST TARGET | Case ID: 23243546<br>Door to Initiation Time<br>63 min | 04/02/21, 12:32PM<br>ROSC<br>34min | Application: Cardiac Arrest<br>Time to target<br>75min | Cooling rate<br>2.8°C/h ▬▬▬ | Patient outcome Case status<br>Survived Not verified | 502d |
| "36°C COOLING" FIRST TARGET | Case ID: 23243547<br>Door to Initiation Time<br>55 min | 04/04/21, 02:58AM<br>ROSC<br>34min | Application: Cardiac Arrest<br>Time to target<br>75min | Cooling rate<br>2.8°C/h ▬▬▬ | Patient outcome Case status<br>Survived Not verified | 502e |

500

Saved searches:
No filter

Search by dates:
From: Select a date
To: Select a date

Search by filters:
Verify status: 522
Select
Alarm:
Select 528
Protocol: 504
Select
Patient outcome: 520
Select Search
🔍 Advanced search

540

Case Histories

---

*502a*

36°C COOLING
FIRST TARGET

Case ID: 23243543  03/25/21, 05:45PM  Patient Type: Cardiac  Cooling rate  Patient outcome  Door to
Door to Initiation Time  ROSC                              Time to target  2.8°C/h         Survived 520    Init Time
70 min 510a            34min 512a                         75min 516a      518a                            28 min
Patient Nickname MEL

---

*502b*

33°C WARMING
FIRST TARGET

Case ID: 23243544  03/28/21, 02:40PM  Patient Type: Other   Warming rate  Patient outcome  Door to
Door to Initiation Time  ROSC                               Time to target  1.8°C/h       Survived         Init Time
48 min                 34min                              75min                                           19 min
Patient Nickname JOEY

---

*502c*

36.5°C NORMO-THERMIA
FIRST TARGET

Case ID: 23243545  03/29/21, 07:19AM  Patient Type: Neuro
Target temp                           Time to target        Time within range  Patient outcome  Door to
36.5°C                                75min                 98% (± 0.5°C) 524  Survived         Init Time
Patient Nickname DOTTY                                                                          31 min

---

*502d*

36°C COOLING
FIRST TARGET

Case ID: 23243546  04/02/21, 12:32PM  Patient Type: Cardiac  Cooling rate  Patient outcome  Door to
Door to Initiation Time  ROSC                               Time to target  2.8°C/h       Survived         Init Time
63 min                 34min                               75min                                          24 min
Patient Nickname DUKE

---

Saved searches:
No filter

Search by dates:
From: Select a date
To: Select a date

Search by filters:
Verify status: 522
Select
Alarm:
Select 528
Protocol: 504
Select
Patient outcome: 520
Select Search    Advanced search
*540*

TEMPERATURE MANAGEMENT CASE REVIEW PERFORMANCE AND TREATMENT ANALYSIS

RELATED APPLICATIONS

This application claims priority to U.S. Provisional Patent Application Ser. No. 63/325,457, entitled "Temperature Management Case Review Performance and Treatment Analysis," filed Mar. 30, 2022. All above identified applications are hereby incorporated by reference in their entireties.

BACKGROUND

In various clinical situations, it is desirable to warm, cool or otherwise control the body temperature of a subject. For example, hypothermia can be induced in humans and some animals for the purpose of protecting various organs and tissues (e.g., heart, brain, kidneys) against the effects of ischemic, anoxic or toxic insult. For example, animal studies and/or clinical trials suggest that mild hypothermia can have neuroprotective and/or cardioprotective effects in animals or humans who suffer from ischemic cardiac events (e.g., myocardial infarction, acute coronary syndromes, etc.), postanoxic coma after cardiopulmonary resuscitation, traumatic brain injury, stroke, subarachnoid hemorrhage, fever and neurological injury.

One method for inducing hypothermia is by intravascular or endovascular temperature management during which a heat exchange catheter is inserted into a blood vessel and a thermal exchange fluid is circulated through a heat exchanger positioned on the portion of the catheter that is inserted in the blood vessel. As the thermal exchange fluid circulates through the catheter's heat exchanger, it exchanges heat with blood flowing past the heat exchanger in the blood vessel. Such technique can be used to cool the subject's flowing blood thereby resulting in a lowering of the subject's core body temperature to some desired target temperature. Endovascular temperature management is also capable of warming the body and/or of controlling body temperature to maintain a monitored body temperature at some selected temperature. If a controlled rate of re-warming or re-cooling from the selected target temperature is desired, that too can be accomplished by carefully controlling the amount of heat added or removed from the body and thereby controlling the temperature change of the patient.

SUMMARY OF ILLUSTRATIVE EMBODIMENTS

In one aspect, the present disclosure relates to a temperature management system for delivering a temperature management therapy to a patient. In some embodiments, the system includes a temperature management device configured to control temperature of a patient, at least one sensor configured to generate temperature data indicative of a treatment temperature, and operations encoded in at least one of i) hardware logic or ii) software logic stored to a non-volatile computer readable medium and configured to be executed on processing circuitry, the operations including delivering temperature management therapy to the patient. The temperature management therapy may include a number of phases, each phase including one or more parameters, where delivering includes, over a period of time of each phase of the number phases, controlling a temperature of the temperature management device to adjust the temperature of the patient in accordance with the one or more parameters of the respective phase. The system may include, based on the temperature data of the at least one sensor, preparing, for presentation at a display of a computing device, a case overview including at least one graph of treatment temperature versus time, where the at least one graph includes a respective timespan of each phase of the number of phases, and preparing the at least one graph for presentation at the display includes fitting each phase of the number of phases to substantially a same size footprint within the display, such that the at least one graph is configured for simultaneous presentation of the timespans of the number of phases at the display, and applying a same temperature scale to each phase of the number of phases such that, when presented at the display as the at least one graph, the number of phases are substantially contiguous.

In some embodiments, preparing includes visually distinguishing each phase of the number of phases. The temperature management therapy may be a hypothermia therapy. The number of phases may include an induction phase, a maintenance phase, a rewarming phase, and a normothermia phase. The temperature management therapy may be a hyperthermia therapy. The number of phases includes an induction phase, a maintenance phase, a cooling phase, and a normothermia phase. The one or more parameters may include at least one of a target temperature, a rate of temperature change, or a target duration.

In some embodiments, the at least one graph includes a series of graphs, each graph of the series of graphs corresponding to a different phase of the number of phases. Preparing the at least one graph for presentation at the display may include configuring positions of the series of graphs to present a substantially contiguous graph of temperature data versus time. Preparing the at least one graph for presentation at the display may include adjusting a time scale of one or more of the series of graphs to fit all of the series of graphs within the single view. The time scale of a given graph of the series of graphs may be different than a time scale of at least one of a preceding graph to the given graph and a following graph to the given graph in the series of graphs. Preparing the case overview may include reducing a number of data points of the respective temperature data of one or more of the number of phases into a portion of data points representative of temperature change during the respective phase. Preparing the at least one graph for presentation at the display may include reducing a number of data points of the respective temperature data of one or more of the number of phases into a number of estimated data points representative of temperature change during the respective phase.

In some embodiments, the at least one graph includes one or more vertical separation elements, where adjacent phases of the number of phases are separated in the at least one graph by at least one vertical separation element of the one or more vertical separation elements. The operations may include receiving user input indicating adjustment of a position of a selected vertical separation element of the one or more vertical separation elements to an adjusted position, and resizing each phase of the adjacent phases separated by the selected vertical separation element in accordance with the adjusted position. Resizing may include determining an adjusted time scale for each phase of the adjacent phases.

In some embodiments, the temperature management device includes an endovascular catheter. The temperature management device may include a surface heat exchange device.

In some embodiments, the operations include receiving user input indicating selection of a single graph display mode, and preparing a single graph for presentation at the display comprises graphing the treatment temperature versus time using a same temperature scale and a same time scale for all phases of the temperature data.

In one aspect, the present disclosure relates to a temperature management system for delivering a temperature management therapy to a patient, the system including a temperature management device configured to control temperature of a patient, at least one sensor configured to generate temperature data indicative of a treatment temperature, and operations encoded in at least one of i) hardware logic or ii) software logic stored to a non-volatile computer readable medium and configured to be executed on processing circuitry. The operations may include delivering temperature management therapy including a first phase configured to adjust or maintain the temperature of the patient in accordance with a target temperature, and a second phase different than the first phase, where delivering includes over a first period of time, controlling a temperature of the temperature management device to adjust the temperature of the patient to the target temperature in accordance with the first phase, and over a second period of time following the first period of time, controlling the temperature of the temperature management device in accordance with the second phase. The operations may include preparing, for presentation at a display of a computing device, a case overview including treatment temperature graphed against time, where preparing includes preparing a first graph of first temperature data corresponding to the first phase, where a time scale of the first temperature data is fitted for presentation within a first region of the display, and preparing a second graph of second temperature data corresponding to the second phase, where the second graph is prepared for presentation in a second region of the display proximate the first region of the display, a time scale of the second temperature data is different than the time scale of the first temperature data, thereby allowing a full timeline of both the first temperature data and the second temperature data to fit within the display, and a temperature scale of the second temperature data matches the temperature scale of the first temperature data such that, in positioning the second graph proximate to the first graph, a substantially contiguous graph is presented between the first graph and the second graph.

In some embodiments, the operations include receiving the first temperature data via a network from a separate computing device. The separate computing device may be the temperature management device. The system may include a temperature probe including the one or more sensors, where the temperature management device receives the temperature data from the temperature probe.

In some embodiments, the temperature management device includes the hardware logic and/or processing circuitry executing the operations including delivering the temperature management therapy. A remote networked computing system may include the hardware logic and/or processing circuitry executing the operations including preparing the case overview. The operations may include receiving, at the remote networked computing system from the temperature management device, the temperature data. A computing device separate from the networked computing system and the temperature management device may include the display. The operations may include providing, to the computing device via a network, information for generating the case overview on the display.

In some embodiments, preparing the case overview includes preparing the case overview during delivery of the temperature management therapy. The treatment management system may include the display.

In some embodiments, the time scale of the second temperature data is fitted for presentation within the second region of the display. The first region and the second region may be substantially identical in size. A time scale of each of the first temperature data and the second temperature data may be fitted to substantially a same size footprint of the display. A time scale of each of the first temperature data and the second temperature data may be fitted based in part on characteristics of the display.

In some embodiments, the first region is separated from the second region by a gap. A line graph illustrating the first temperature data and the second temperature data may span the gap as a continuous line.

In some embodiments, the second phase is a maintenance phase. The first phase may include the target temperature. The temperature management therapy may be a hypothermia therapy. A number of phases including the first phase and the second phase may include an induction phase, a maintenance phase, a rewarming phase, and a normothermia phase.

In some embodiments, the temperature management therapy is a hyperthermia therapy. A number of phases including the first phase and the second phase may include an induction phase, a maintenance phase, a cooling phase, and a normothermia phase.

In some embodiments, delivering the temperature management therapy includes, over a third period of time following the second period of time, controlling the temperature of the temperature management device in accordance with a third phase, and presenting the treatment temperature graphed against time includes preparing, for presentation in a third region of the display, a third graph of third temperature data corresponding to the third phase. The operations may include, after beginning the third period of time, reducing a size of the second region, adding the third region to the display, and fitting a time scale of the second temperature data for presentation within the reduced size second region of the display. The third phase may be a rewarming phase.

In some embodiments, the operations include, prior to delivering the temperature management therapy, determining a temperature management therapy profile including the first phase and the second phase. The operations may include receiving, via a network connection, initial temperature data representing an initial time period prior to delivering the temperature management therapy, where presenting the treatment temperature graphed against time includes preparing, for presentation in another region of the display proximate to the first graph, an initial graph of the initial temperature data. The initial temperature data may be generated by an ambulatory medical device used to monitor or treat the patient while in transit to a location of the temperature management device.

In some embodiments, the operations include determining, based on the first temperature data, a time of completion of the first phase, and dividing, for presenting the treatment temperature graphed against time, the temperature data generated by the at least one sensor between the first temperature data and the second temperature data. Determining the time of completion may include receiving a control signal triggering beginning of the second phase. Determining the time of completion may include determining that the patient temperature is maintained within a predetermined range of the target temperature for a predetermined time.

In some embodiments, the patient temperature represents a blood temperature or a surface temperature upon the skin of the patient. The temperature of the temperature management device may be adjusted via a temperature-controlled liquid, the system further including a circulation device configured to circulate the temperature-controlled liquid to and from the temperature management device. The at least one sensor may include a sensor of the circulation device configured to generate the temperature data indicative of a liquid temperature of the temperature-controlled liquid. The circulation device may include the display. The at least one sensor may be configured to generate the temperature data indicative of a patient temperature.

In some embodiments, the temperature management device includes an endovascular catheter. The temperature management device may include a surface heat exchange device. The surface heat exchange device may be a liquid-filled pad, a garment, or a blanket.

In some embodiments, presenting the treatment temperature graphed against time includes labeling the first phase and the second phase. Labeling may include labeling at a top of each of the first region of the display and the second region of the display. Labeling may include adding a text label including at least one of the following: induction, maintenance, rewarming, cooling, or normothermia.

In one aspect, the present disclosure relates to a method for automatically determining discrete stages of therapy in temperature data corresponding to a multi-stage temperature management therapy, the method including receiving, by processing circuitry, temperature data from at least one sensor coupled to a temperature management device, the temperature data representing temperature management therapy delivery by the temperature management device over a period of time, identifying, by the processing circuitry from the temperature data, a number of target temperatures, each target temperature corresponding to a respective stage of a sequence of stages of the temperature management therapy delivery, analyzing, by the processing circuitry, the temperature data to determine a time of achieving a first target temperature of the number of target temperatures, for each additional target temperature of the number of target temperatures, analyzing, by the processing circuitry, subsequent temperature data to determine a time of achieving the respective target temperature, dividing, by the processing circuitry using the times of achieving each target temperature of the number of target temperatures, the temperature data into a number of temperature data sets corresponding to the sequence of stages, and preparing, by the processing circuitry, a set of graphs corresponding to the number of temperature data sets. Preparing may include determining a time scale of each graph of the set of graphs such that each graph is fitted for presentation within a same-sized region of a display, thereby allowing a full timeline of the temperature data to fit within the display, where a same temperature scale is applied to each graph of the set of graphs such that, in aligning the set of graphs in the sequence of stages, a substantially contiguous graph is presented within the display.

In some embodiments, determining the time of achieving each respective target temperature includes identifying maintenance of temperature at or near the target temperature for a predetermined period of time. The predetermined period of time may be in a range of five seconds to one minute. Determining the time of achieving each respective target temperature may include identifying a first instance of a temperature within a predetermined range of the target temperature followed by maintenance of temperature at or below the target temperature for a predetermined period of time. The predetermined range may be within a half of a degree Celsius of the target temperature.

In some embodiments, the method includes determining, by the processing circuitry using state information of the temperature management device, an end time of the temperature management therapy. The end time may correspond to powering off the temperature management device. The end time may correspond to identifying selection of a setting indicative of a new patient.

In some embodiments, the method includes identifying, by the processing circuitry, prior temperature data corresponding to the same patient, and adding, by the processing circuitry to the temperature data, the prior temperature data. The prior temperature data may correspond to a different medical equipment than the temperature management device.

In some embodiments, the method includes applying, based on a difference between each subsequent target temperature and a preceding target temperature, a respective type of stage of temperature management therapy. The types of stages may include one or more of an induction stage, a maintenance stage, or a rewarming stage.

In some embodiments, preparing the set of graphs includes presenting, in relation to the set of graphs, at least one case metric based on at least one of the target temperature or a threshold temperature corresponding to at least one stage of the sequence of stages. The at least one case metric may include one or more of a time within target temperature range, a time to achieving target temperature, a fever metric, a cooling rate, or a warming rate. The fever metric may be a fever burden calculated using a difference between patient temperature and the threshold temperature or in view of a length of time the patient temperature exceeds the threshold temperature. The fever burden may be calculated using an area under the curve formula. The fever metric may be calculated as a percentage of time patient temperature exceeds the threshold temperature during the at least one stage.

In one aspect, the present disclosure relates to a temperature management system for delivering a temperature management therapy to a patient, the system including a temperature management device configured to adjust or maintain temperature of a patient, at least one sensor configured to generate temperature data indicative of a treatment temperature, and operations encoded in at least one of i) hardware logic or ii) software logic stored to a non-volatile computer readable medium and configured to be executed on processing circuitry, the operations including over a period of time, delivering a temperature management therapy to the patient by controlling a temperature of the temperature management device to adjust or maintain the temperature of the patient in accordance with a target temperature, where delivery includes tracking a current temperature using signals from the at least one sensor, and calculating, based at least in part on the current temperature, a) a cooling power level exerted by the temperature management device while adjusting or maintaining the temperature of the patient, and/or b) a warming power level exerted by the temperature management device while adjusting or maintaining the temperature of the patient, and preparing, for presentation at a display of a computing device, a case overview including at least one graph of treatment temperatures versus time. The treatment temperatures may be obtained from the temperature data, and preparing the at least one graph may include co-registering treatment temperatures and power levels using a common coordinate of time, where the power levels include cooling power levels graphed against time and/or warming power levels graphed against time, thereby visually indicating a relationship between movements in patient temperature and corresponding power exerted by the temperature management device to achieve the movements in patient temperature.

In some embodiments, the operations include receiving the temperature data via a network from a separate computing device. The separate computing device may be the temperature management device. The temperature management device may include the hardware logic and/or processing circuitry executing the operations including delivering the temperature management therapy. A remote networked computing system may include the hardware logic and/or processing circuitry executing the operations including preparing the case overview. The computing device may be separate from the networked computing system and the temperature management device.

In some embodiments, delivering the temperature management therapy includes delivering the temperature management therapy using at least one heat exchange instrument. The at least one heat exchange instrument may include an endovascular catheter. The at least one heat exchange instrument may include a surface instrument. The surface instrument may be one of a fluid-filled pad, a blanket, or a garment.

In some embodiments, presenting includes presenting in real time during delivery of the temperature management therapy. The cooling power levels graphed against time may be visually distinguished from the warming power levels graphed against time in the at least one graph. The temperature data may be graphed using a primary x-axis and a primary y-axis, the power levels may be graphed using a secondary x-axis and a secondary y-axis, and visually distinguishing may include graphing the warming power levels above the secondary x-axis and graphing the cooling power levels below the secondary x-axis. The cooling power levels may be graphed in a first color, and the warming power levels may be graphed in a second color visually distinct from the first color. Visually distinguishing may include graphing the warming power levels and the cooling power levels as an area under the curve.

In some embodiments, the warming power levels are calculated as a percentage of a maximum warming power level and/or the cooling power levels are calculated as a percentage of a maximum cooling power level. The current temperature may be a bath temperature. Calculating the cooling power level exerted by the temperature management device while adjusting or maintaining the temperature of the patient, and/or the warming power level exerted by the temperature management device while adjusting or maintaining the temperature of the patient may include determining a difference between a bath temperature and the current temperature, where the current temperature is a patient temperature, and the bath temperature represents a fluid circulated by the temperature management device to manage the patient temperature. Calculating the cooling power level exerted by the temperature management device while adjusting or maintaining the temperature of the patient, and/or the warming power level exerted by the temperature management device while adjusting or maintaining the temperature of the patient may include determining a difference between a maximum bath temperature and the current temperature, and calculating the power level as a ratio of i) the difference between the bath temperature and the current temperature and ii) the difference between the maximum bath temperature and the current temperature.

In some embodiments, the operations include presenting, at the display, a number of metrics. The operations may include calculating, from the temperature data, at least one of a cooling rate of decreasing temperature over time and/or a warming rate of increasing temperature over time, and presenting, at the display, the cooling rate and/or the warming rate as part of the number of metrics. The operations may include calculating a time within a predetermined range of the target temperature, and presenting, at the display, the time as part of the number of metrics. The predetermined range may be user-selectable from one of a set of ranges. The operations may include calculating a length of time of delivering the temperature management therapy to achieve the target temperature, and presenting, at the display, the length of time as part of the number of metrics.

In some embodiments, the target temperature is a first target temperature, and delivering the temperature management therapy includes, for at least a portion of a time period of the therapy, adjusting patient temperature to achieve or maintain a second predetermined target temperature different than the first target temperature.

In some embodiments, the case overview includes at least one case metric based on at least one of the target temperature or a threshold temperature. The at least one case metric may include one or more of a time within target temperature range, a time to achieving target temperature, a fever metric, a cooling rate, or a warming rate. The fever metric may be a fever burden calculated using a difference between patient temperature and the threshold temperature in view of a length of time the patient temperature exceeds the threshold temperature. The fever burden may be calculated using an area under the curve formula. The fever metric may be calculated as a percentage of time patient temperature exceeds the threshold temperature during the temperature management therapy.

In one aspect, the present disclosure relates to a system for enabling post-case analysis of temperature management system performance trends, the system including a temperature management system including a temperature management device configured to adjust or maintain temperature of a patient, at least one sensor configured to generate signals indicative of a treatment temperature, and a network communication module, and a computing system remotely located from the temperature management system, the computing system including operations encoded in at least one of i) hardware logic or ii) software logic stored to a non-volatile computer readable medium and configured to be executed on processing circuitry. The operations may include receiving, via a network from the network communication module of the temperature management system, therapy delivery information regarding delivery of temperature management therapy to the patient by the temperature management system, where the therapy delivery information includes temperature data generated by the temperature management system based at least in part on the signals of the at least one sensor, and at least one target temperature, receiving physiological data corresponding to at least one of a first time period prior to collection of the temperature data or a second time period concurrent with the collection of the temperature data, determining, from the temperature data and the physiological data, two or more performance metrics, where determining includes calculating, using the temperature data, at least one temperature performance metric of the two or more performance metrics, where the at least one temperature performance metric includes at least one of a cooling rate, a warming rate, or a time to target temperature, identifying, from the physiological data, at least one event or alarm, determining, from a combination of the physiological data and the therapy delivery information, at least one event-driven performance metric of the two or more performance metrics, where the at least one event-driven performance metric includes at least one of a time from the event or alarm to reaching the target temperature or a time from the event or alarm to a beginning the temperature management therapy, preparing, for presentation at a display, case review dashboard information including the two or more performance metrics, and providing, for presentation at the display for review by a user, the case review dashboard.

In some embodiments, the physiological data is obtained from at least one additional equipment. The case review dashboard information may include at least one graph of treatment temperatures versus time, where the treatment temperatures are obtained from the temperature data. The at least one of the time from the event or alarm to reaching the target temperature or the time from the event or alarm to beginning the temperature management therapy may be a time from return of spontaneous circulation (ROSC). The at least one of the time from the event or alarm to reaching the target temperature or the time from the event or alarm to beginning the temperature management therapy may be a time from the delivery of manual or mechanical chest compressions. Preparing the at least one graph may include co-registering treatment temperatures with one or more events or alarms of the at least one event or alarm. The at least two performance metrics may be presented in a metrics region of the display and/or a case summary region of the display.

In some embodiments, the case overview information includes timeline information for presentation in a timeline region of the display presenting a timeline of a number of events prior to a time of initiation of the temperature management therapy. The number of events may include one or more of an emergency notification time, an emergency personnel arrival time, a cardiopulmonary (CPR) initiation time, a hospital arrival time, or a return of spontaneous circulation (ROSC) time.

In some embodiments, the timeline includes the time of initiation of the temperature management therapy. The case overview information may include patient information for presentation in a patient information region of the display. The patient information may include at least one health status indicator including one or more of a COVID status or a MRSA status.

In some embodiments, the temperature management system includes a heat exchange instrument, where the temperature management device is configured to adjust or maintain the temperature of the patient by controlling the heat exchange instrument. Calculating the at least one temperature performance metric may include calculating one or more temperature performance metrics based on a type of the heat exchange instrument. The heat exchange instrument may be an endovascular catheter. The heat exchange instrument may be a surface instrument.

In some embodiments, the network communication module is a wireless network communication module. The computing system may include a cloud server.

In some embodiments, the operations include obtaining at least one of CPR data, defibrillation data, or ventilation data corresponding to a timeframe prior to and/or concurrent with a timeframe of the temperature data. The operations may include identifying, from the CPR data, one or more events. The operations may include identifying, from the defibrillation data, one or more events.

In some embodiments, the number of events or alarms includes a ROSC event, a CPR initiation event, or a ventilation initiation event. The number of events or alarms may include a high patient temperature alarm or a low patient temperature alarm. The number of events or alarms may include an equipment failure alarm.

In one aspect, the present disclosure relates to a temperature management system configured to present therapy data collected by multiple devices regarding temperature management treatment of a patient, the system including a temperature management device configured to adjust or maintain temperature of a patient, at least one physiological monitoring device configured to monitor physiological parameters of the patient, at least one sensor configured to generate temperature data indicative of a treatment temperature, and operations encoded in at least one of i) hardware logic or ii) software logic stored to a non-volatile computer readable medium and configured to be executed on processing circuitry. The operations may include controlling delivery of temperature management therapy to the patient using the temperature management device, receiving, via a wired or wireless connection, physiological data from the at least one physiological monitoring device, analyzing the physiological data for one or more types of events, identifying, from the analyzing, at least one event, and configuring, for presentation at a display, a graph of treatment temperature versus time, where configuring the graph includes using the temperature data generated by the at least one sensor, preparing at least one graph of treatment temperature versus time, co-registering a time of each event of the at least one event with a respective temperature of the treatment temperatures represented in the graph, and overlaying the graph at the time of each event with a respective event marker.

In some embodiments, the operations include receiving the temperature data via a network from a separate computing device. The separate computing device may be the temperature management device.

In some embodiments, the system includes a temperature probe including the at least one sensor, where the temperature management device receives the temperature data from the temperature probe. The system may include a heat exchange instrument, where the temperature management device controls the heat exchange instrument to adjust the temperature of the patient. The heat exchange instrument may include the at least one sensor, and the temperature management device may receive the temperature data from the heat exchange instrument. The heat exchange instrument may be a surface instrument. The surface instrument may be a pad, a blanket, or a garment. The heat exchange instrument may be an endovascular catheter.

In some embodiments, the temperature management device includes the hardware logic and/or processing circuitry executing the operations including controlling delivery of the temperature management therapy. A remote networked computing system may include the hardware logic and/or processing circuitry executing the operations including preparing the case overview. The operations may include receiving, at the remote networked computing system from the temperature management device, the temperature data.

In some embodiments, a computing device separate from the networked computing system and the temperature management device includes the display. The operations may include providing, to the computing device via a network, information for generating the case overview on the display. The event marker may be configured to identify a given type of the one or more types of events. The physiological monitoring device may be an automated resuscitation device. The physiological monitoring device may be an automated external defibrillator (AED) device. The one or more types of events may include one or more of a CPR event, a defibrillation event, or a ROSC event.

In some embodiments, overlaying the graph at the time of each event with the respective event marker includes logically linking at least one event marker with event detail data. The event detail data may be available, at the display, through interaction with the at least one event marker. Overlaying the graph at the time of each event with the respective event marker may include presenting, visually connected to a point on the graph of treatment temperature, an icon representative of a respective type of the respective event. Overlaying the graph at the time of each event with the respective event marker may include presenting text including a time of the respective event.

In some embodiments, overlaying the graph at the time of each event with the respective event marker includes overlaying each event marker as a user-selectable event marker. Each respective event marker may be user-selectable to add one or more further details regarding the respective event. Each respective event marker may be user-selectable to edit one or more details regarding the respective event. Each respective event marker may be user-selectable to delete the respective event.

In some embodiments, configuring the graph of treatment temperature versus time includes overlaying the graph with a user-positionable reference marker. The reference marker may present, at a current position on the graph, at least one corresponding temperature. The at least one corresponding temperature may be one of a patient temperature, a target temperature, or a bath temperature. The reference marker may present at a current position on the graph, a corresponding power value. The corresponding power value may be one of a power mode or a power level.

In some embodiments, the reference marker includes at least one user-selectable control. The user-selectable control may enable the user to add a new event marker to the graph.

In one aspect, the present disclosure relates to a temperature management system for delivering a temperature management therapy to a patient, the system including a temperature management device configured to control temperature of a patient, at least one sensor configured to generate temperature data indicative of a treatment temperature, and operations encoded in at least one of i) hardware logic or ii) software logic stored to a non-volatile computer readable medium and configured to be executed on processing circuitry, the operations including delivering temperature management therapy to the patient, where the temperature management therapy includes at least one phase, including one or more parameters, where delivering includes, over a period of time of the at least one phase, controlling a temperature of the temperature management device to adjust the temperature of the patient in accordance with the one or more parameters of the phase, based on the temperature data of the at least one sensor, preparing, for presentation at a display of a computing device, a case overview, and providing a user with two selectable case overview options, the two case overview options including a first case overview option depicting a single graph of treatment temperature versus time and a second case overview option depicting a number of graphs of treatment temperature versus time, where each graph represents a separate phase of the temperature management therapy, and the number of graphs are substantially contiguous.

In some embodiments, the single graph represents the entire temperature management therapy, and the number of graphs represent the entire temperature management therapy. The temperature management device may include an endovascular catheter. The temperature management device may include a surface heat exchange device. The surface heat exchange device may be one of a fluid-filled pad, a blanket, or a garment.

In some embodiments, the case overview includes at least one case metric based on at least one parameter of the one or more parameters corresponding to one or more phases of the at least one phase. The at least one case metric may include one or more of a time within a target temperature range, a time to achieving a target temperature, a fever metric, a cooling rate, or a warming rate. The at least one parameter may include the target temperature or a threshold temperature. The fever metric may be a fever burden calculated using a difference between patient temperature and the threshold temperature in view of a length of time the patient temperature exceeds the threshold temperature. The fever burden may be calculated using an area under the curve formula. The fever metric may be calculated as a percentage of time patient temperature exceeds the threshold temperature during the temperature management therapy.

In one aspect, the present disclosure relates to a temperature management system for delivering a temperature management therapy to a patient, the system including a temperature management device configured to control temperature of a patient, at least one sensor configured to generate temperature data indicative of a patient temperature, and operations encoded in at least one of i) hardware logic or ii) software logic stored to a non-volatile computer readable medium and configured to be executed on processing circuitry, the operations including delivering temperature management therapy to the patient, where the temperature management therapy includes at least one phase, each phase of the at least one phase including one or more parameters, where delivering includes, over a period of time of the at least one phase, periodically capturing, via the at least one sensor, a current patient temperature as patient temperature data, and controlling a temperature of the temperature management device to adjust or maintain the current patient temperature in accordance with the one or more parameters of the phase. The operations may include, based at least in part on the patient temperature data of the at least one sensor, preparing, for presentation at a display of a computing device, a case overview, where the preparing includes calculating, based at least in part on the patient temperature, at least one case metric, where calculating the at least one case metric includes a calculating, using the patient temperature data in view of a threshold temperature value, a fever metric representative of patient temperature exceeding the threshold temperature.

In some embodiments, the fever metric is a fever burden metric, and calculating the fever metric includes calculating, over time, a difference between patient temperature and the threshold temperature in view of a length of time where the patient temperature data represents patient temperature exceeding the threshold temperature. The fever burden may be calculated using an area under the curve formula. The fever metric may be calculated as a percentage of time the patient temperature data represents patient temperature exceeding the threshold temperature during the temperature management therapy. The threshold temperature may be a target temperature for the temperature management therapy. The preparing may include generating, from the patient temperature data, a graph of patient temperature over time.

The foregoing general description of the illustrative implementations and the following detailed description thereof are merely exemplary aspects of the teachings of this disclosure and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 5A and FIG. 5B are example case history user interfaces presenting synopses of temperature management therapy sessions;

DETAILED DESCRIPTION OF ILLUSTRATIVE EMBODIMENTS

Figure 1A:
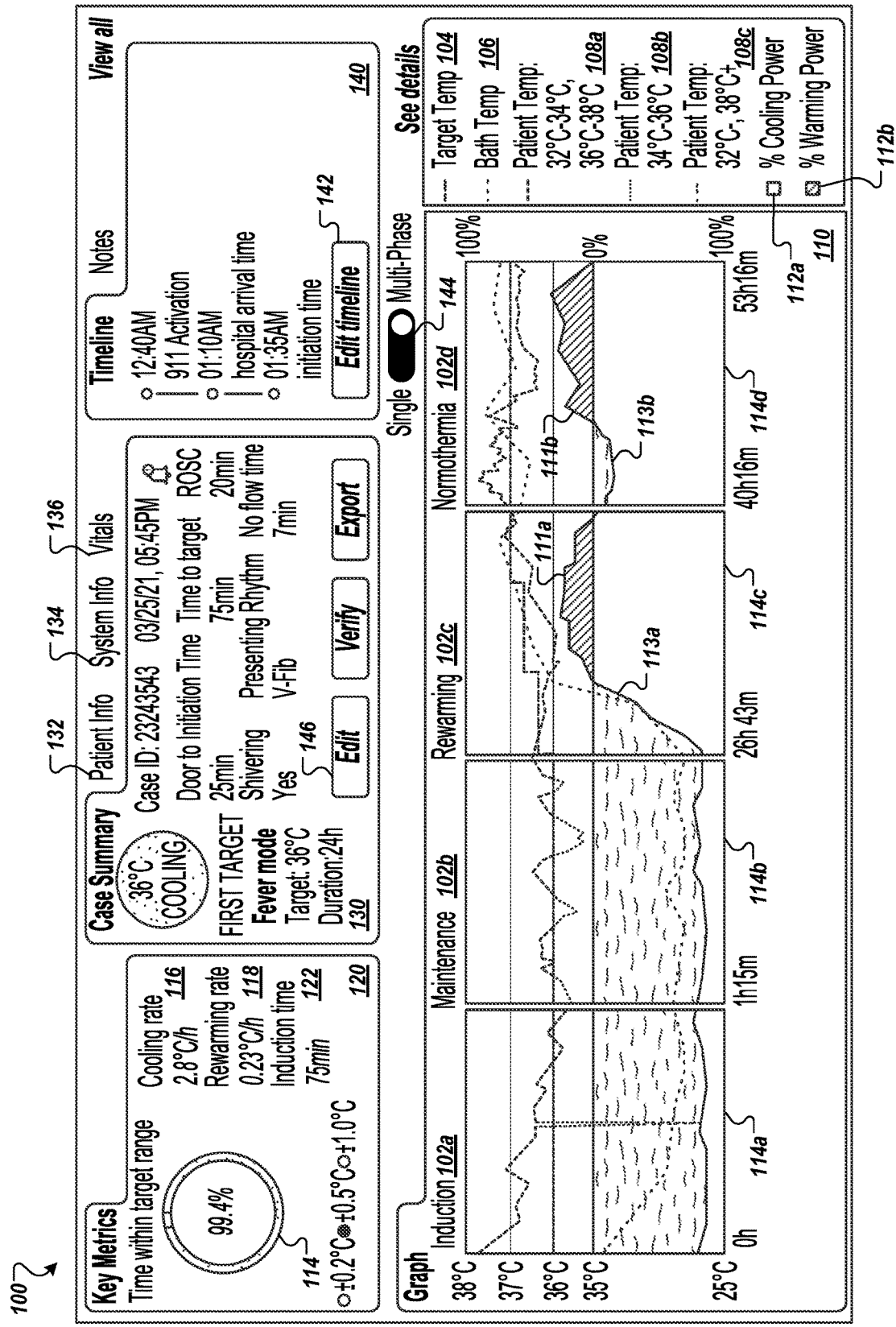
FIG. 1A is an example case review user interface presenting details regarding multiple stages of a temperature management therapy.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

The present disclosure relates to gathering and displaying information during the course of temperature management therapy. The systems and methods described herein can be implemented using a variety of temperature management treatment medical devices designed to monitor and adjust a patient's temperature. The information described herein is useful both for providing a greater depth of information to clinicians during temperature management treatment of a patient, to optimize therapy, and for analyzing metrics during post case review, including comparative analytics.

In some implementations, systems and methods are disclosed herein for preparing a visual representation of multiple stages, or phases, of temperature management therapy within a single user interface view. The user interface view, for example, may be presented on a temperature management control unit display or on a computing device display or monitor. Due to the timeframe of temperature management therapy, which can last for tens of hours if not multiple days, the detailed changes in patient temperature during stages of the therapy involving actively modifying the patient's temperature (e.g., induction, cooling, rewarming, etc.) can be difficult to discern due to the time spans of therapy stages involving fairly static patient temperature (e.g., maintenance, normothermia). For this reason, in some embodiments, rather than presenting each stage using a same time scale, the time scale of the portion of the graph corresponding to a fairly static phase may be adjusted to be less granular than a time scale of a portion of the graph corresponding to a stage involving active temperature adjustment of the patient. In some embodiments, each stage of temperature management therapy may be presented in substantially a same size section or footprint of the display screen. The adjustment of graph portion sizing and/or graph timescale provides the benefit of inclusion of three, four, or even more phases of temperature management therapy within a single view, providing a complete picture to a clinician or other end user of the lifecycle of the temperature management therapy. The view, in some examples, may present the lifecycle of the temperature management therapy to a current (ongoing) point of therapy, a selected point of therapy, or the entire span of a completed therapy. To provide a substantially same size region or footprint, some examples, no single phase or stage will be presented in a region or footprint more than about 5% different, 10% different, or up to 20% different in size than any other phase or stage, such that no one phase or stage dominates the display.

In some implementations, systems and methods are disclosed herein for preparing a visual representation of temperature management therapy combined with a graphical representation of power expended for warming and/or cooling a patient. This graphical presentation provides the clinician or other end user with the benefit of easy interpretation of the effort being expended to adjust or maintain a patient's temperature, since the graphical representation (e.g., area above or under the curve) represents a relative power level which is easy to read and interpret, rather than a numeric value.

Systems and methods are disclosed herein, in some implementations, for preparing a time-based graphical representation of temperature management therapy combined with event markers and/or alarm markers identifying discrete times of patient care events and/or alarms occurring prior to and/or during temperature management therapy. This provides the benefit of a holistic view of other patient therapies or support provided to a patient that coincide with the temperature management therapy. A clinician, for example, may review a stage of temperature management therapy and patient temperature at a time indicated upon the graph of an event such as the beginning of cardiopulmonary resuscitation (CPR).

FIG. 1A is an example case review user interface 100 presenting details regarding multiple stages 102 of a temperature management therapy, e.g., temperature management therapy provided using an intravascular heat exchange catheter, or temperature management therapy provided using a heat exchange surface device applied to the surface of a patient. The user interface 100, for example, may be presented during or after temperature management therapy has been provided to a patient. The temperature management therapy, for example, may involve cooling and/or warming, e.g., induction of hypothermia or hyperthermia. In the user interface 100, a viewer is presented with a graph section 110 presenting multiple line graphs of temperature over time, a key metrics section 120 presenting metrics achieved over a timeframe of the temperature management therapy, a case summary section 130 presenting key factors of the temperature management therapy, and a timeline section 140 presenting times of key events of patient treatment. The information provided to the user through the user interface may have been collected from multiple devices and/or through multiple potential avenues. For example, at least a portion of the information presented in the case review user interface 100 represents data automatically generated by a temperature management device. In another example, at least a portion of the information presented in the case review user interface 100 represents data manually entered via the temperature management device and/or a user interface such as the user interface 100 (as described in greater detail below). Certain metrics presented in the user interface 100 may have been calculated, based on data retrieved from other sources such as the temperature management device, for presentation at the user interface 100. Various options for automatically capturing and/or manually entering information for use in generating the user interface 100 are described in further detail below, for example in relation to certain capabilities of the user interfaces represented in FIG. 1A, FIG. 1B, FIG. 2, FIG. 3A, and FIG. 3B. Further, in some implementations, information manually entered via a user interface such as those presented in FIG. 1A and/or FIG. 1B may modify contents of or auto populate other user interfaces, such as the user interfaces discussed in relation to FIG. 2, FIG. 3A, FIG. 3B, FIG. 5A, FIG. 5B, FIG. 6A, and/or FIG. 6B.

As illustrated in the graph section 110, a target temperature 104 is graphed for each stage 102 of the temperature management therapy, representing at least one temperature the therapy aims to achieve for the patient at the corresponding stage of the temperature management therapy. The target temperature 104 may be compared to a patient temperature 108. The patient temperature data 108 may be determined through one or more temperature sensors on or in the patient. The patient temperature data 108 may represent a blood temperature or a surface temperature of the patient (e.g., obtained from the skin of the patient). In some embodiments, data from multiple temperature sensors are combined to determine current patient temperature.

As illustrated, the stages may include a plurality of phases, e.g., an induction phase, a maintenance phase, a rewarming phase, and a normothermia phase, e.g., when inducing hypothermia in a patient. In the circumstance of inducing hyperthermia in a patient, the stages may instead involve an induction phase, a maintenance phase, a cooling phase, and a normothermia phase. In addition to and/or instead of target temperature, at one or more stages, other parameters may be monitored for completion of a given stage. The other parameters, in some examples, may include a rate of temperature change or a target duration of time. The target temperature and/or other parameters, in some embodiments, are part of a preconfigured temperature management therapy profile. In other embodiments, a clinician or user may trigger a switch or manual control to change from one temperature management therapy stage to another for at least a portion of the temperature management therapy.

Beginning with an induction stage 102a, the target temperature 104 is set at 36° C., while a bath temperature 106 of the fluid being delivered to a temperature management device to cool the patient appears to be falling from about 35° C. to below 30° C. in an effort to bring an initial patient temperature (e.g., approximately 37.6° C.) down to the target temperature 104. In addition to the bath temperature 106, as illustrated, an area above the curve 113a, 113b, designated by a first pattern, represents a cooling power 112a (e.g., amount of effort) exerted to reduce the patient temperature from the initial temperature to the target temperature 104. The cooling power 112a, for example, may be calculated as a percentage of maximum effort exerted by the temperature management system or a percentage of the maximum cooling capacity of the temperature management system to cool, reduce and/or maintain the bath temperature 106.

During a maintenance stage 102b, the target temperature 104 remains set at 36° C., while the patient temperature 108 bounces above and below the target temperature line. As illustrated, the patient temperature line graph may be further represented in different styles, colors, symbols or font (108a, 108b, and 108c) depending upon which temperature range the patient's current temperature falls within. In the illustration, a first set of ranges 108a is used to represent patient temperature ranging from the target temperature 104 of the induction phase 102a and maintenance phase 102b to 38° C. (e.g., about 0.4° C. above the initial patient temperature) as well as between 32° C. and 34° C., while a second range 108b is used to represent patient temperature within a range of 34° C. to 36° C. A third range 108c is used to represent patient temperature dropping below 32° C. and above 38° C. The first range 108a, for example, may be considered to be a safe range, therapeutic range, and/or or target temperature range for the patient (e.g., illustrated in green), while the second range 108b may be considered a shivering zone where the patient may be likely to shiver. The third range 108c, in this example, may be used to alert a caregiver or technician of a potentially dangerous or out of range temperature to the patient (e.g., illustrated in red). Meanwhile, the area above the curve representing the cooling power 112a continues to represent significant effort in maintaining the patient's temperature.

Turning to a rewarming stage 102c, the target temperature is set to increase during this stage 102c in a series of steps between 36° C. and 37° C. The series of steps, for example, may be timed such that the temperature management system is controlled to return the patient's temperature from the 36° C. to 37° C. gradually. As illustrated, the area above the curve 113a, representing the cooling power 112a, switches, during the rewarming stage 102c, to an area under the curve 111a representing a warming power 112b exerted to warm the patient through the target temperature steps.

Finally, in a normothermia stage 102d, the target temperature 104 is maintained at 37° C., while the area over the curve representing cooling power 112a and area under the curve representing warming power 112b exert effort to maintain the patient temperature 108 at about the target temperature 104.

In some implementations, the cooling power levels and/or the warming power levels are calculated as a percentage of a maximum power level. To calculate the power level, in some embodiments, a difference between the bath temperature 106 and the patient temperature 108 is determined. In some embodiments, a difference between a maximum bath temperature (coldest or warmest depending on cooling power level or warming power level) and the patient temperature 108 is determined. The power level may be calculated, for example, as a ratio of the difference between the bath temperature 106 and the current patient temperature 108 and the difference between the maximum bath temperature and the current patient temperature 108. Calculating the power level, for example, may include determining whether the temperature management device is actively adjusting or maintaining temperature, and setting the power level to zero at times when the active temperature management is not taking place. In an illustrative example, if a pump configured to circulate a temperature-controlled fluid is not running, the power level may be set to zero.

In some implementations, the cooling power levels and/or the warming power levels may be calculated, in situations involving a circulated temperature-controlled fluid or coolant, using an inlet temperature and an outlet temperature of the circulation system. In some examples, a pump speed or a flow meter may provide indication of power exertion. To calculate the cooling power levels and/or warming power levels, further to the example, a constant of proportionality may be provided in the algorithm to equate the temperature differences with the circulation flow.

In some implementations, to determine an absolute power level (e.g., represented in Watts) rather than a proportional power level (represented as a percentage of maximum power), a type of heat exchange device, such as a model or manufacturer of the particular catheter, pad, blanket, or garment in use, may be used to determine a constant of proportionality to convert the relative power levels to Watts units. The type of heat exchange device, for example, may be entered by a user of the temperature management system or derived from a log file of the temperature management system.

As illustrated in the graph section 110, each temperature management therapy stage 102a-d is presented in a same size graph segment 114a-d, graphed against time. However, the timespan of the induction stage 102a according to the graph segment 114a was 1:15, while a graph segment 114b presenting the maintenance phase 102b is marked as spanning 1:15-26:43. Thus, a time scale of the maintenance stage 102b is significantly compressed in comparison to a time scale of the induction stage 102a. As demonstrated further by the rewarming stage 102c (graph segment 114c at 26:43-40:16) and the normothermia stage 102d (graph segment 114d at 10:16-53:16), the data for each graph segment 114 is adjusted to fit its space within the user interface 100 so that a full representation of the temperature management therapy is presented to the end user, despite the therapy having lasted for over 53 hours. If each of the stages 102 had instead been graphed along a same time scale, a user would either need to scroll for a long period of time through the maintenance phase, or details captured during the induction phase would be completely lost in presenting the graph in a single view. Thus, the presentation scheme of the graph segments 114 provides the end user with the benefit of a holistic view of a lengthy temperature management therapy session that is easy to review and digest. In other embodiments, the individual graph segments 114a-d may differ in size while still providing the benefit of fitting all phases of temperature management therapy within a single view.

Although illustrated as individual boxed graph sections separated by gaps and labeled above with a name of each stage of temperature management therapy, in other implementations, the individual graph sections may be visually separated in another manner while still forming a substantially contiguous graph of temperature over time. In some examples, individual stages of temperature therapy may be indicated within a graph by a single broken or solid vertical line, by different background colors, and/or by a highlighted frame color overlaying the graph. Although illustrated as having a break between each graph section, in other embodiments, the individual line graphs may carry through the gap, connecting the graph segments 114.

In some implementations, the user interface 100 includes a control 144 for shifting the view of the graph 114 between a multi-phase graph (e.g., a set of individual phase-labeled graphs, as illustrated) to a single graph view (e.g., with the full set of the data presented in the standard temperature versus time). The multi-phase graph 114, for example, may be the default view, while the control 144 is provided to move from the default view to a single graph view. Unlike the multi-phase graph 114, the single graph view may lack the labels 102 (e.g., induction, maintenance, rewarming normothermia, etc.) of the multi-phase graph 114. The single graph view, in some embodiments, is presented within the same footprint of the display 100 as the multi-phase graph 114. In some embodiments, for example involving longer timespans of thermal therapy, the single graph view may be presented with a scroll bar for reviewing the full span of the temperature management therapy data. In some embodiments, when switching from the multi-phase view to the single graph view, using the control 144, only the most recent phase is presented. For example, when reviewing ongoing temperature management therapy, the single view may be a single-phase display for tracking therapy metrics for the in-progress phase. In some embodiments, a single graph view may show temperature management therapy data for therapy having a single phase, e.g., for a neuro patient type.

Turning to the key metrics section 120 above the graph section 110, a percentage of time within range 114 of the target temperature 104 is presented, along with range options of ±0.2° C., ±0.5° C. (as illustrated), and ±1.0° C. The percentage of time within target range 114 graph provides the reader with an idea of accuracy of temperature control provided by the temperature management system. Additionally, the key metrics section 120 includes a cooling rate 116 (2.8° C./h) and a rewarming rate 118 (0.23° C./h). An induction time 122 of 75 minutes corresponds to the timespan illustrated in the first graph segment 114*a*.

In some implementations, a collection of data captured in information sections 130, 132, 134, and 136 provide the user a rich display of treatment facts, metrics, and/or clinical notes in a single view presented through selection of the various information sections 130, 132, 134, and 136 as described in greater detail below. Using the information sections 130, 132, 134, and 136, for example, the user derives the benefit of accessing many key knowledge points within a single user interface. A case summary section 130 includes an overview of a patient treatment case involving the temperature management therapy session. As illustrated, the case summary section 130 presents an overall therapy goal (e.g., to cool the patient to 36° C.), a time to target temperature (75 minutes, matching the timeframe of the first graph segment 114*a*), a mode of therapy labeled "fever mode", indication of target temperature of 36° C., and a duration of time at the target cooling temperature of 36° C. of 24 hours. The case summary section 130 also provides information regarding conditions of the patient (e.g., ROSC: 20 minutes, shivering: yes, presenting rhythm: V-Fib, and no flow time: 7 minutes). In some embodiments, the case summary section 130 includes a time from ROSC to beginning of the temperature management therapy or a time from delivering manual or mechanical chest compressions to a time of initiating temperature management therapy.

Additionally, the case summary section 130 lists a case identifier uniquely identifying a patient treatment including the temperature management therapy session. The patient treatment, as noted in the timeline section 140, can be tracked from an emergency contact time (e.g., 911 activation at 12:40 AM), to a time of arrival at the medical facility (e.g., hospital arrival time at 1:35 AM), and further to an initiation time of the temperature management therapy session (e.g., initiation time of 1:35 AM). The timeline section 140 includes an edit timeline control 142 for adding, removing, and/or adjusting milestones within the case tracking timeline. In some examples, an emergency personnel (e.g., ambulance or other rescue vehicle) arrival time, an initiation of CPR time, and/or a ROSC time may be added to the timeline section 140. In the case summary section 130, the timeline information is referenced in a door to initiation time of 25 minutes (e.g., a time from hospital arrival to initiation).

Rather than reviewing the case summary section 130, in some implementations, the user may select a patient information section 132 to learn more about the demographics and/or medical history of the patient. For example, the patient information section 132 may include demographics such as a patient age, gender, weight, and/or height. The patient information section 132, in further examples, may include medical history information such as history of organ implant and/or internal monitoring and/or assistance equipment such as a pacemaker. In another example, the patient information section 132 may include medical status information such as, in some implementations, a coronavirus (COVID) status or a methicillin-resistant *Staphylococcus aureus* (MRSA) status. A system information section 134 may be selected to learn more about the temperature management system setup, such as types of equipment being used, a battery status for battery-powered equipment, and/or any error or alarm conditions related to the equipment. A vitals information section 136 may be selected to obtain more information on the physical state of the patient, such as heart rate, blood pressure, current temperature, and/or pulse. Further, the vitals information section 136 may include one or more alarm conditions related to the physiological state of the patient, such as blood oxygen level low, blood pressure high, or temperature outside of a safe range.

In some implementations, a user is provided an edit control 146 of the case summary section 130 (and, in some examples, replicated on the patient information summary 132, the system information summary 134, and/or the vitals summary 136) to edit information presented in at least the summary section(s) 130, 132, 134, and/or 136 of the user interface 100. Further, in some embodiments, the editing functionality provided through the edit control 146 allows the user to enter or alter information captured in the timeline section 140 (e.g., in addition to or instead of using the edit timeline control 142). The editing operations, further, may modify information presented in other user interfaces described herein, such as user interfaces portrayed in FIG. 5A and FIG. 5B.

Figure 1B:
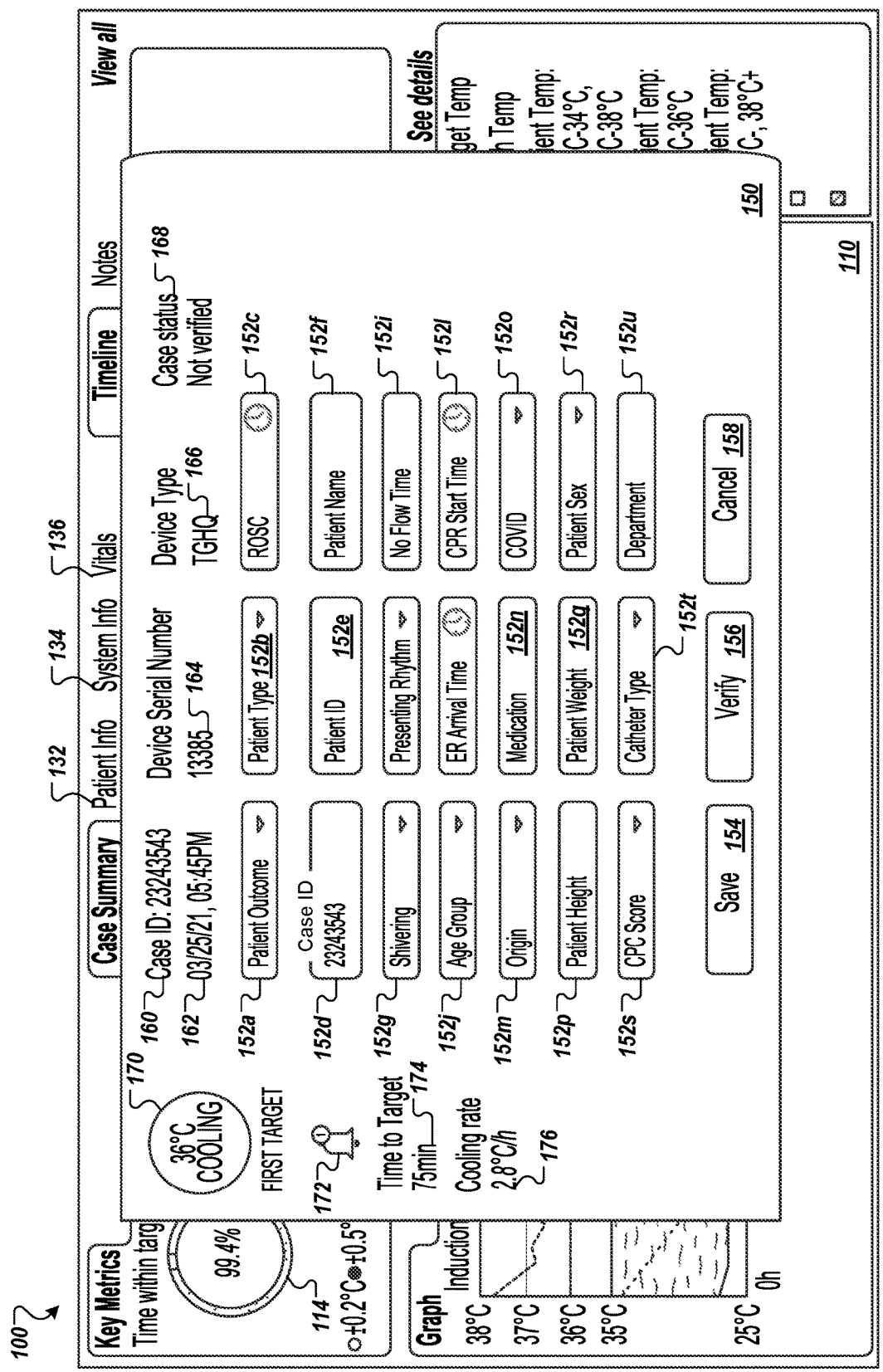
FIG. 1B presents the example case review user interface of FIG. 1A overlaid with an editing pop-up screen.

Turning to FIG. 1B, in some implementations, an editing pop-up screen 150 includes a synopsis of case information, for example including information found in the key metrics section 120, the case summary section 132, the system information section 134, and/or the vitals section 136. Additionally, the editing pop-up screen 150 includes a set of controls 152, including drop-down menus and data entry controls, for adding or adjusting information regarding the temperature management therapy and/or the patient.

The case information presented in the pop-up screen 150, in some implementations, includes a case identifier 160, a timestamp 162, a heat exchange device serial number 164, a heat exchange device type 166, e.g., intravascular or surface, and a case status 168. Further, the case information may include a temperature management therapy type 170, an alarm indicator 172, a time to target temperature 174, and a cooling rate 176.

As illustrated, the set of controls 152 includes a patient outcome control 152*a*, a patient type control 152*b*, a ROSC control 152*c*, a case identifier control 152*d*, a patient identifier control 152*e*, a patient name control 152*f*, a shivering control 152*g*, a presenting rhythm control 152*h*, a no flow time control 152*i*, an age group control 152*j*, an emergency room (ER) arrival time control 152*k*, a CPR start time control 152*l*, an origin control 152*m*, a medication control 152*n*, a COVID status control 152*o*, a patient height control 152*p*, a patient weight control 152*q*, a patient sex control 152*r*, a CPC score control 152*s*, a catheter type control 152*t*, surface type control, and a department control 152*u*.

The information associated with certain controls 152, in some implementations, if modified, added, or removed, can cause the graph region 110 to adjust. For example, upon modifying the catheter type 152*t* or surface type, the power graphs 112*a*, 112*b* may adjust due to a power calculation algorithm being based in part upon a type of heat exchange instrument. In another example, modification of the case identifier 152*d* to a case identifier associated with a different case may cause merging or replacing of the temperature data of the case presented in FIG. 1A with temperature data of the newly entered case identifier, for example resulting in a greater number of phases of temperature management therapy presented within the graph region 110.

In some implementations, a user reviews the information presented in the pop-up screen 150, confirms validity and/or adjust the contents of the various controls 152, and selects a verify control 156 to move the case status 168 from "not verified" to "verified." To modify information via the controls 152, the user may select a save control 154. To exit out of the pop-up screen 150 without making changes to the information or verifying the case, the user may select a cancel control 158.

Figure 1C:
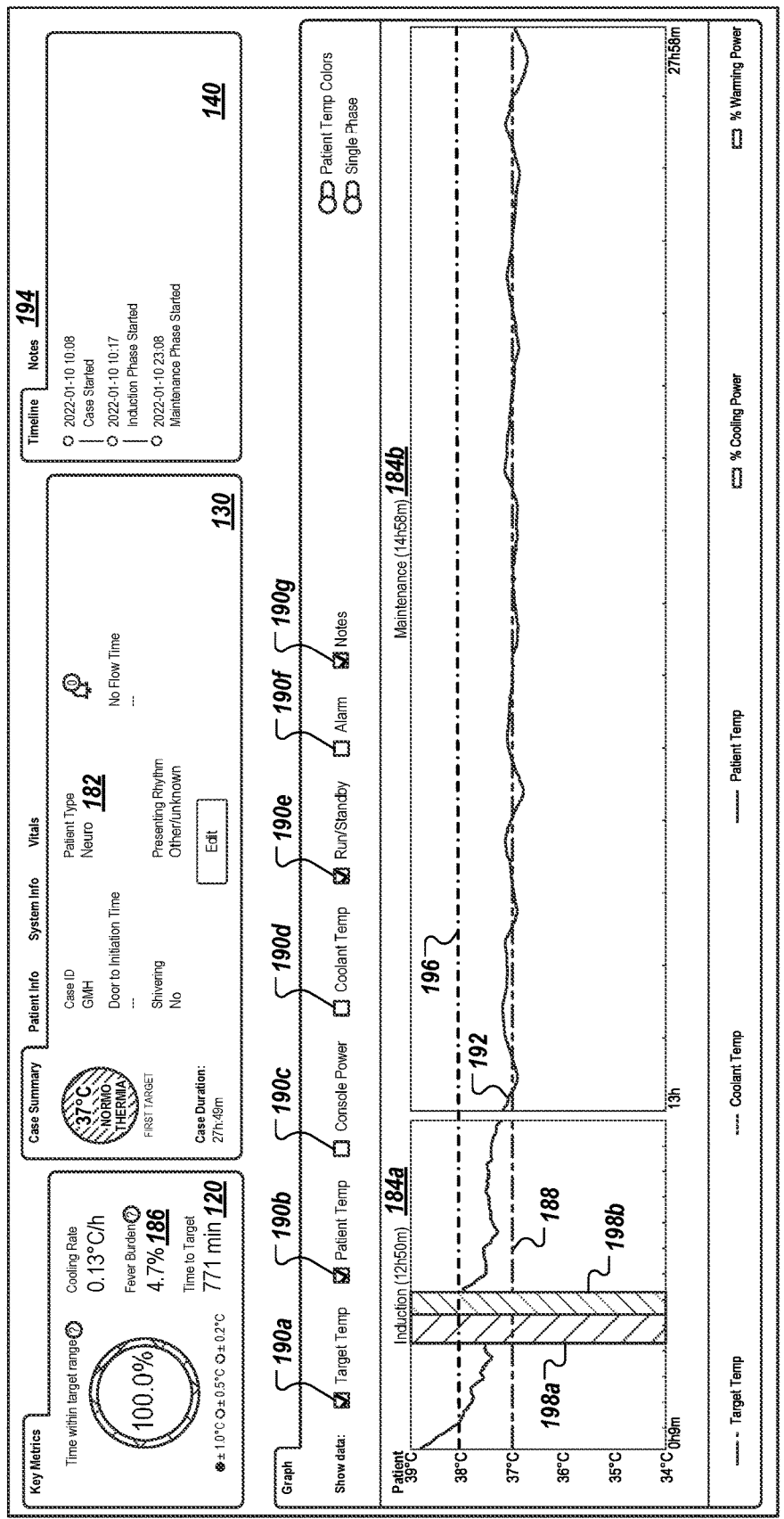
FIG. 1C is an example case review user interface presenting details regarding multiple stages of temperature management therapy for care of a neurological patient.

FIG. 1C illustrates a second example case review user interface 180 presenting details regarding multiple stages 102 of a temperature management therapy involving a neuro type 182 patient, as indicated in the case summary section 130 of the user interface 180. Two therapy stages 184 are included in the user interface 180—an induction stage 184*a* and a maintenance stage 184*b*. In neuro treatment, for example, a patient exhibiting fever may be brought down to a normal body temperature or treatment temperature during the induction phase 184*a* and then maintained at the desired temperature during the remainder of treatment, also referred to as the maintenance phase 184*b*. As illustrated, maintenance may be prolonged to many hours or even a number of days.

Maintaining patient temperature below fever is important to brain health of neuro patients. For this reason, as illustrated in the key metrics section 120, a fever metric 186 (e.g., 4.7%) is displayed (in this example, the fever metric is displayed as a fever burden), representing the portion of treatment time during which the patient demonstrated a temperature characterized as being a fever. In some examples, the fever metric 186 may be calculated using patient temperature data corresponding to a particular phase (e.g., throughout the induction phase, throughout the maintenance phase, etc.), captured throughout an entire treatment duration (e.g., induction phase 184*a* and maintenance phase 184*b*, as illustrated), or captured throughout a duration of operational availability (e.g., connected to the system, powered on, etc.) of a cooling device. In the event that the patient was transitioned between temperature management systems, the fever metric 186 may capture only the post-transition data. In certain embodiments where a corresponding fever metric value is available and/or temperature data sufficient to derive such value, the fever metric 186 may be calculated to represent a total value across both systems. The fever metric 186 may be calculated based on a particular threshold temperature for differentiating between normal temperatures and fever temperatures. The threshold temperature, in some examples, may be set to 37° C. (98.6° F.), 100° F., 38° C. (e.g., 100.4° F.), or 38.3° C. The threshold temperature, for example, may represent a temperature over which a cooling device automatically activates to reduce patient temperature. In some implementations, the threshold temperature is customizable and/or related to a particular therapy. For example, as illustrated, a threshold temperature 196 may be set to a value (e.g., 38° C.) above a target temperature 188 for neuro therapy (e.g., 37° C.). In another example, the target temperature may be substantially equivalent to the threshold temperature.

The fever metric 186, in some embodiments, is calculated as a percentage of time during treatment at which the temperature of the patient was at or above a threshold temperature. As illustrated, for example, the fever metric 186 of 4.7% may represent an amount of time patient temperature was above the threshold temperature 196 of 38° C. throughout the entire treatment (e.g., induction phase 184*a* as well as maintenance phase 184*b*).

In other embodiments, the fever metric 186 represents fever severity (e.g., the difference between patient temperature and threshold temperature 196) in view of fever duration (e.g., time above the threshold temperature 196). The fever metric 186, for example, may represent a maximum fever metric value calculated based on a highest patient temperature and/or longest fever duration during therapy (e.g., a maximum product of patient temperature and fever duration out of a set of data including multiple timespans with patient temperature above the threshold temperature 196, each timespan associated with at least one patient temperature). The fever metric 186, in another example, may be based on an aggregation of fever severity in view of fever duration for each fever event (e.g., patient temperature exceeding threshold temperature) throughout a period of time, such as the time period options described above. For example, the fever metric 186 may be calculated using an area under the curve (AUC) formula (e.g., a total fever burden or AUC of fever burden). The aggregation may be presented as ° C.-hours. In this manner, rather than 4.7%, the fever metric 186 may be identified as 4.7° C. h. In some implementations, the fever burden calculation includes a ramping up or ramping down adjustment to estimate the area under the curve between a pair of patient temperature values in which only one value is above the temperature threshold. Applying adjustments in calculating the fever metric 186 may depend on frequency of patient temperature measurements. For example, when patient temperature is sampled relatively infrequently (e.g., every 20 minutes, every 30 minutes, or every hour), the metric may be relatively inaccurate without applying ramp-up and ramp-down adjustments that estimate smooth transitions between a time of no fever exhibited and a time of a very being captured in the patient temperature data. Conversely, when patient temperature is sampled relatively frequently (e.g., every 10 minutes, every 5 minutes, every minute, every 30 seconds, etc.), a simpler algorithm could be applied to estimate aggregate fever burden without adjusting for transitioning pairs of temperature measurements while maintaining reasonable accuracy. For improved accuracy, both frequent sampling and ramping up/ramping down adjustments may be employed, such as, in an illustrative example, temperature sampling every minute in combination with calculating the area under the curve while including ramping up and ramping down adjustments to the calculation.

In some embodiments, the threshold temperature(s), subject time period(s), and/or type(s) of fever metric calculation(s) performed may be user customizable, for example in a settings menu. Further, in some embodiments, one or more alarms may be established to alert medical personnel in the event of a threshold fever metric. In illustration, while maintaining temperature of a neuro patient, a high fever metric value may be indicative of there being benefit in switching to a more powerful cooling device.

Although described in relation to fever, in further metrics, a correlating below threshold temperature metric and/or hypothermia metric may be calculated to represent patient temperatures dropping below a lower threshold temperature or otherwise dropping below a desirable band of temperatures (e.g., below a minimum patient temperature). In one example, a lower threshold temperature may be normothermic temperature (e.g., 37.0° C. or 37.3° C.). The lower threshold temperature, for example, may represent a threshold below which a heating device may automatically activate to warm the patient. In illustration, while maintaining patient temperature during the maintenance phase 184*b*, a heating device may be activated when patient temperature drops below the lower threshold temperature by a threshold amount and/or for a threshold period of time. The below threshold temperature metric and/or hypothermia metric may be calculated using any of the example algorithms described above in relation to the fever metric 186, such as a percentage of time or area above the curve metric.

In some implementations, the case review user interface 180 includes selectable controls 190 enabling a user to toggle different types of information on and off of the screen. As illustrated, a target temperature control 190*a* is activated, corresponding to the target temperature plot 188. A patient temperature control 190*b* is activated, corresponding to a patient temperature plot 192. A console power control 190*c* is deactivated, corresponding to the cooling/warming power plot 112 of FIG. 1A and FIG. 2. A coolant temperature control 190*d* is deactivated, corresponding to a temperature of coolant delivered to a heat exchange device, such as a liquid-cooled catheter or blanket, used to manage patient temperature. A machine status control 190*e*, when selected, may present a current status of the heat exchange device (e.g., on, active, run, standby, off, etc.). Running, for example, may indicate that the machine is controlling patient temperature, while standby may be a state in which the machine has been provided at least one therapy instruction, such as a target temperature, but has not yet been activated to control patient temperature. An alarm control 190*f*, when selected, may present one or more alarms at times of occurrence on the graphical display. A notes control 190*g* may provide a user with the opportunity to review notes related to the case, for example in a notes section 194 of the display.

As illustrated, the machine status control 190*e* is selected. In the graph, a first vertical band 198*a* may represent a period of time during which the heat exchange device was in a standby mode, while a second vertical band 198*b*, abutting the first vertical band 198*a*, may represent a period of time during which the heat exchange device was powered off. An operator of the heat exchange device may have powered the heat exchange device back on, for example, due to patient temperature meeting or exceeding the temperature threshold 196. In other embodiments, the machine status control, when activated, may cause presentation of identifiers beneath the graph and/or extending to a point below the patient temperature plot (e.g., up to no more than about 36.8° C.) such that the patient temperature 192 is not obscured.

Figure 2:
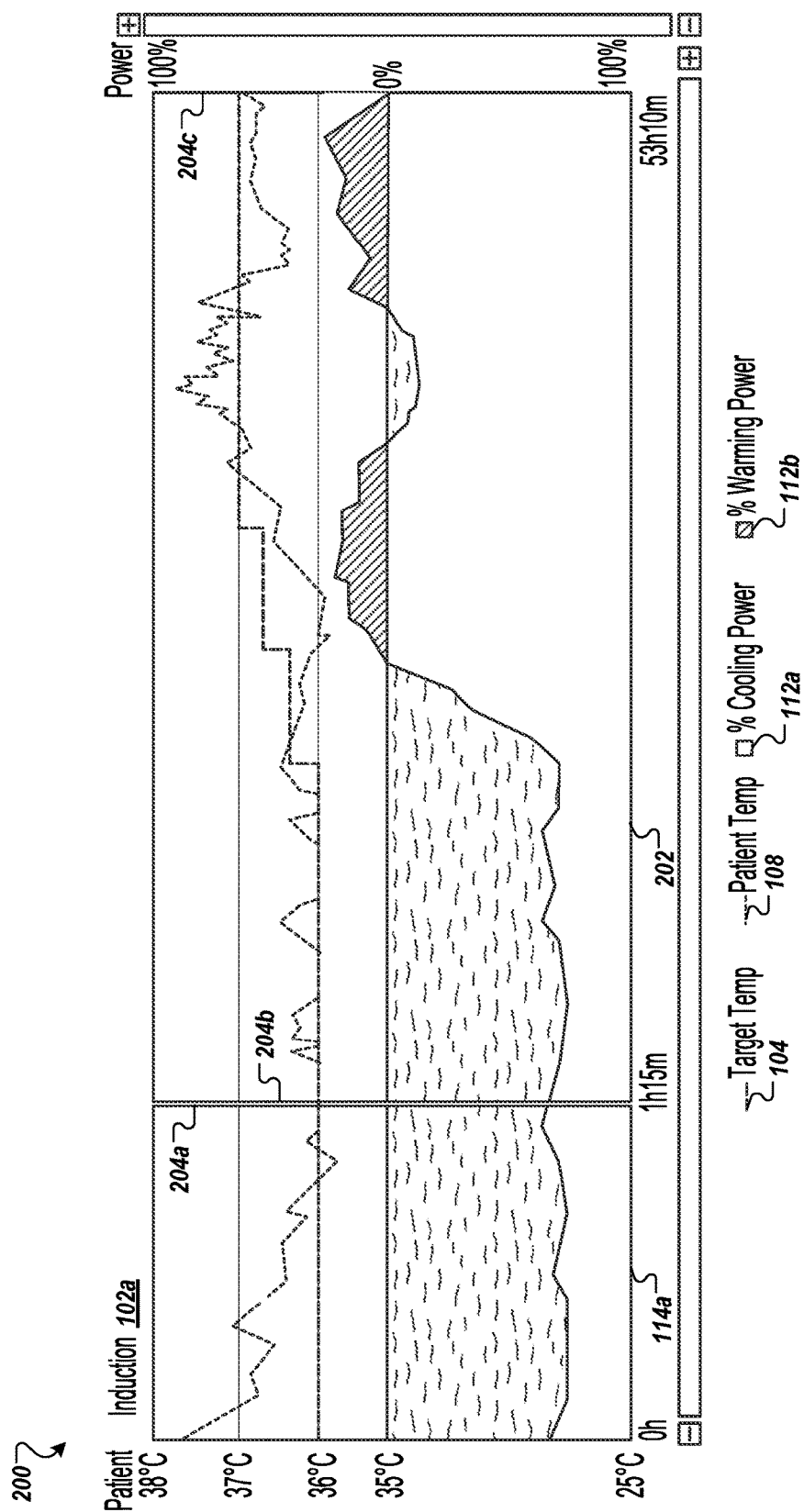
FIG. 2 is another example case review user interface.

FIG. 2 is another example case review user interface 200 representing a temperature management therapy session. In the user interface 200, the induction stage 102*a* is sectioned into its graph segment 114*a*, while a remaining portion of the temperature management therapy data is presented in a remaining graph segment 202.

In some implementations, the user interface 200 represents an ongoing temperature management therapy session, where the temperature data has not yet been analyzed to separate portions of the temperature management data into stages of temperature management therapy. In some embodiments, the induction phase 102 represents historic data imported to the temperature management system from a different temperature management device. The different temperature management device, for example, may be an ambulatory medical device used to monitor or treat the patient while in transit to a location of the temperature management system. The second graph segment 202, in some embodiments, represents an ongoing temperature management therapy stage that has not yet been completed.

The user interface 200, in some implementations, represents data from a completed temperature management therapy session where a user has manipulated the user interface to remove graph segments or to expand a single graph segment. In some embodiments, the user interface provides the user with the ability to "open" a particular graph segment 114 to view a larger portrayal of the data contained therein. The user interface, in some embodiments, provides the user with the ability to adjust borders between graph segments 114, for example by dragging a vertical border 204 of a particular graph segment. For example, the graph segment 202 could represent an enlarged version of the graph segment 114*b* of FIG. 1A.

In further implementations, a graph of temperature management therapy over time, such as the graph 110 of the user interface 100 of FIG. 1A or the graph of the user interface 200 of FIG. 2, includes graphical segments representing temperature management therapy conducted over a longer-term duration, such as a duration of three or more days, up to one week, up to ten days, or over the span of multiple weeks. The temperature management therapy, for example, may be segmented into multiple temperature management therapy sessions, each session involving a same heat exchange instrument (e.g., an internal device such as an endovascular catheter, a surface device such as an external pad, garment, or blanket, etc.) or two or more different heat exchange instruments. In some embodiments, multiple heat exchange instruments may be used concurrently during at least a portion of temperature management therapy. A heat exchange instrument, in some embodiments, may be replaced or moved during temperature management therapy. For example, a particular heat exchange instrument may be moved from one location of the patient's body to another.

In the circumstance of multiple temperature management therapy sessions, each past temperature management therapy session may be presented in a single "thumbnail view" for selection and expansion to review each stage of the temperature management therapy, while an ongoing temperature management therapy session may be represented in multiple graphical segments, such as illustrated in FIG. 1A and FIG. 2. Further, switches between different heat exchange instruments may be graphically represented, for example using a text label, color-coding, modification of graphing style (e.g., line gradient, line dash type, and/or other visual representation).

Figure 3A:
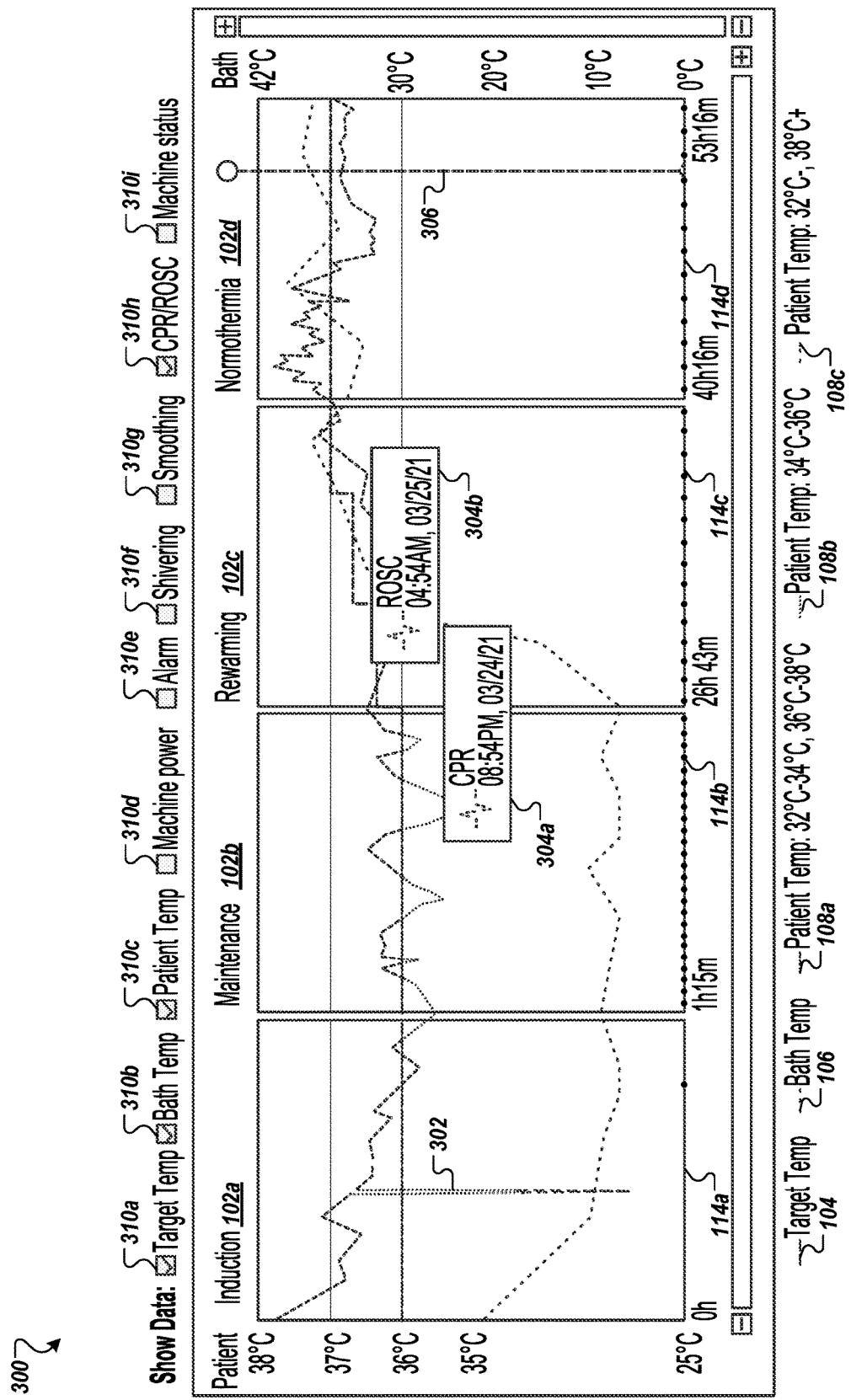
FIG. 3A is an example case review user interface including event markers.
Figure 3B:
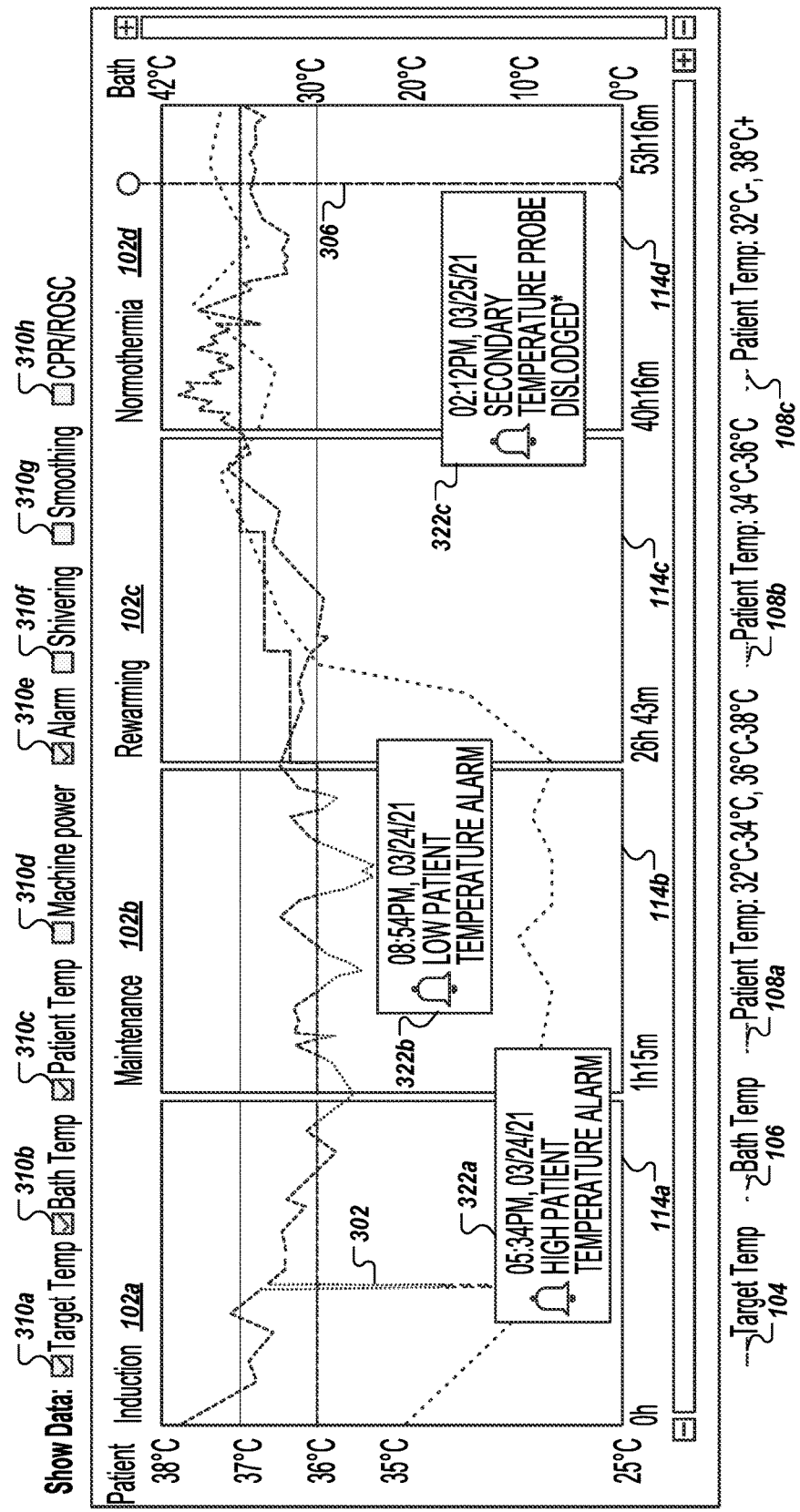
FIG. 3B is an example case review user interface including alarm markers.

Turning to FIG. 3A and FIG. 3B, in some implementations, a case review user interface representing a temperature management therapy session can be overlaid with additional information, such as, in some examples, patient events, patient alarms, treatment events, and/or medical equipment alarms. In some embodiments, events and/or alarms are automatically added to the interface based on information generated by the temperature management system, such as patient temperature alarms. For example, physiological information may be gathered from one or more sensors of the temperature management system configured to monitor patient physiological parameters.

Certain events and/or alarms, in some implementations, can be automatically added to the interface based upon information collected by the temperature management system or another computing device analyzing the information from sources other than the temperature management system. The information, in some examples, may include physiological data regarding a patient and/or operational data regarding medical equipment. For example, physiological information may be shared with the temperature management system or the separate computing system by one or more medical devices used for monitoring patient physiological parameters during temperature management therapy. The information, in some examples, may include defibrillation data captured by a defibrillator device such as an automated external defibrillator (AED) device, CPR data captured by an automated chest compression device, and/or ventilation data captured by a ventilation device. The temperature management system or other computing system, for example, may analyze patient physiological information and/or medical device operational data to identify one or more events and/or alarms. At least a portion of the physiological information and/or operational information, in some embodiments, is obtained by the temperature management system or another computing system analyzing data collected by the temperature management system via a network connection. For example, a cloud computing system may accumulate data from the temperature management systems and other systems and/or medical devices post temperature management therapy to conduct case review analysis. The data may be analyzed to identify one or more events and/or alarms as well as to co-register times of the events and/or alarms with the temperature management data generated by the temperature management system. In some embodiments, some events and/or alarms can be added by a user.

Beginning with FIG. 3A. in some implementations, a case review user interface 300 includes a show data menu including selectable controls 310 enabling a user to toggle different types of information on and off of the screen. As illustrated, a target temperature control 310a is activated, corresponding to the target temperature plot 104. A bath temperature control 310b is also activated, corresponding to the bath temperature plot 106. A patient temperature control 310c is activated, corresponding to the patient temperature plot 108. A machine power control 310d is deactivated, corresponding to the cooling/warming power plot 112 of FIG. 1A and FIG. 2. An alarm control 310e, a shivering control 310f, a smoothing control 310g, and a machine status control 310i are deactivated. The shivering control 310f, when selected, may present indication of the patient shivering during temperature management therapy. The shivering, for example, may be entered into the user interface by a medical professional. In some embodiments, one or more physiological sensors may identify and log shivering of the patient. In further embodiments, shivering may be anticipated when a patient temperature is measured within range of a shivering range of temperatures (e.g., between 34° C. and 36° C.).

When shivering has been detected either manually or automatically, in some implementations, an edit option in the user interface 300 may provide a user to enter one or more medications supplied to the patient. The smoothing control 310g, in some embodiments, is activated to remove anomalies from the plotted data, such as the anomalous temperature spike 302 illustrated in relation to the patient temperature plot 108. A smoothing function, for example, may automatically identify and discard outlying data to remove extraneous noise from the graph. In another example, upon selection of the smoothing control 310g, the user may be provided with the option of identifying one or more data points to remove to smooth the data (e.g., manually or semi-automatically smoothing the data presented in the graph).

The machine status control 310i, when selected, may present a current status of the heat exchanger (e.g., on, active, run, standby, off, etc.). Running, for example, may indicate that the machine is controlling patient temperature, while standby may be a state in which the machine has been provided at least one therapy instruction, such as a target temperature, but has not yet been activated to control patient temperature. When the machine is active, temperature management therapy may have concluded but the machine may still be actively monitoring patient temperature and/or other information regarding the patient. In another example, the machine may switch to the active or standby state when temperature therapy parameters are changing, such as, in some examples, at least one target temperature is being adjusted, a new temperature delivery device is being added, or a prior temperature delivery device is being switched with a different temperature delivery device.

As illustrated, a CPR/ROSC control 310h is activated, corresponding to two event markers 304a, 304b. Each event marker 304a, 304b includes a time and a date of the event, and the event markers 304a, 304b are positioned as graph overlays in the user interface 300 in positions representing the times at which each event occurred. A CPR event marker 204a, for example, indicates that CPR was initiated toward the end of the maintenance phase 102b. In another example, a ROSC event marker 304b indicates that return of spontaneous circulation occurred in the rewarming stage 102c, seven hours after initiation of CPR.

In some implementations, each event marker 304a, 304b is user-selectable to review further details of the event, such as patient physiological parameters, location, and/or equipment used. The details, for example, may be logically linked to the event marker. In some embodiments, each event marker 304a, 304b is user-selectable to delete and/or edit each CPR event, for example to add further details regarding the event.

The user interface 320, in some implementations, includes a reference marker control 306. The user may be able to move the reference marker control 306, for example, horizontally along the graph sections 114 to any selected position in time. The reference marker control 306, in some embodiments, is selectable by the user to present data corresponding to the time at which the reference marker control 306 is positioned. The data, for example, can include one or more temperatures, such as the patient temperature, the bath temperature, and/or the target temperature. In another example, the data may include a power value indicative of a power mode and/or a power level for controlling the temperature of the patient.

As illustrated in FIG. 1A and FIG. 2, a right-hand y-axis is labeled from 100% below, to 0, to 100% above, indicating a range for the cooling power 112a and warming power 112*b*. Conversely, the right-hand y-axis of FIG. 3A is labeled with temperature, indicating a range for the bath (e.g., coolant) temperature, while the left-hand y-axis of all user interfaces is labeled for monitoring a range of patient temperatures. In embodiments where both the machine power option 310*d* and the bath temperature option 310*b* are activated, two right hand y-axis ranges may be labeled in the user interface. Further, in some embodiments, rather than presenting a relative power level (e.g., percentage of maximum power), the right-hand y-axis may be marked with power units, e.g., Watts.

The x-axis, in some implementations, is marked with a series of dots, hashes, dashes, or other markers indicating time intervals, e.g., hours, minutes, etc. As illustrated in FIG. 3A, for example, the hours are marked with black dots. As can be readily appreciated, the induction phase 102*a*, including just a single dot, represents a much shorter period of time than the maintenance phase 102*b* which is marked with many dots.

In some implementations, the user may add information to the user interface 300 via the reference marker control 306. For example, a user may locate the reference marker control 306 at a time at which an event occurred. The user may be able to select the reference marker control 306 to add details regarding a new event to be added to the user interface 300. Although the event markers of FIG. 3A relate to the CPR/ROSC control 310*h*, in other embodiments, additional types of events may be automatically included and/or manually added by an end user. The additional types of events, in some examples, can include a defibrillation event and/or a pharmaceutical dosing event. A graphic indicator may reference the type of event (or alarm). For example, as illustrated in the event markers 304*a*, 304*b*, a graphic "heartbeat" is illustrated.

In some implementations, the user is provided the option to add a phase 102 to the user interface 100 of FIG. 1A or 300 and/or remove an existing phase 102 from the user interface 100 or 300. A phase may be added, for example, using the reference marker control 306 to break up presented data in one of the graph segments 114 into more refined phases than initially presented in the user interface 300. For example, the reference marker control 306, upon hovering over, right clicking, or other selection, may present an option for adding a phase of a selected type (e.g., induction, maintenance, rewarming, normothermia, etc.). Further, in some embodiments, in adding the phase, the user may enter one or more of a type, a target temperature, a start time, an end time, or a total length of time. In this manner, for example, the user may submit the timeframe at the display. In other implementations, a user may add a phase by hovering over, right clicking, or other selection of a particular phase 102 of the graph 114 to divide the selected phase into two phases.

A phase may be removed, in some implementations, using the reference marker control 306 to combine two or more presented stages into a single stage. A stage may be removed, for example, using the reference marker control 306 to merge presented data in two or more graph segments 114 into a combined stage or phase. For example, the reference marker control 306, upon hovering over, right clicking, or other selection, may present an option for removing a phase of the graph 114 (e.g., the phase 102 the reference marker control 306 is presently positioned in). In other implementations, a user may remove a phase by hovering over, right clicking, or otherwise selecting one of the gaps between graph sections 114*a*-*d*.

Turning to FIG. 3B, an example case review user interface 320 includes alarm markers 322*a*, 322*b*, 322*c*. The alarm markers 322, for example, may be added to the user interface 320 through activating the alarm control 310*e* from the show data menu above the graph. Similar to the event markers 304*a*, 304*b* of FIG. 3A, the alarm markers 322*a*, 322*b*, and 322*c* are each overlaid on the graph sections 114 at a time of the respective alarm. Further, each of the alarm markers 322*a*, 322*b*, and 322*c* is associated with a time stamp and a date stamp as well as an icon of a bell indicating that the information presented relates to an alarm. As illustrated, the alarm markers 322 include a high patient temperature alarm 322*a*, a low patient temperature alarm 322*b*, and a secondary temperature probe dislodged alarm 322*c*. Each alarm marker 322*a*-*c*, in some embodiments, is user-selectable to obtain further information about the alarm, to delete the alarm, and/or to edit information associated with the alarm.

In some implementations, the user may add alarms to the user interface 320 via the reference marker control 306. For example, a user may locate the reference marker control 306 at a time at which an alarm-generating event occurred. The user may be able to select the reference marker control 306 to add details regarding a new alarm to be added to the user interface 320.

Figure 4A:
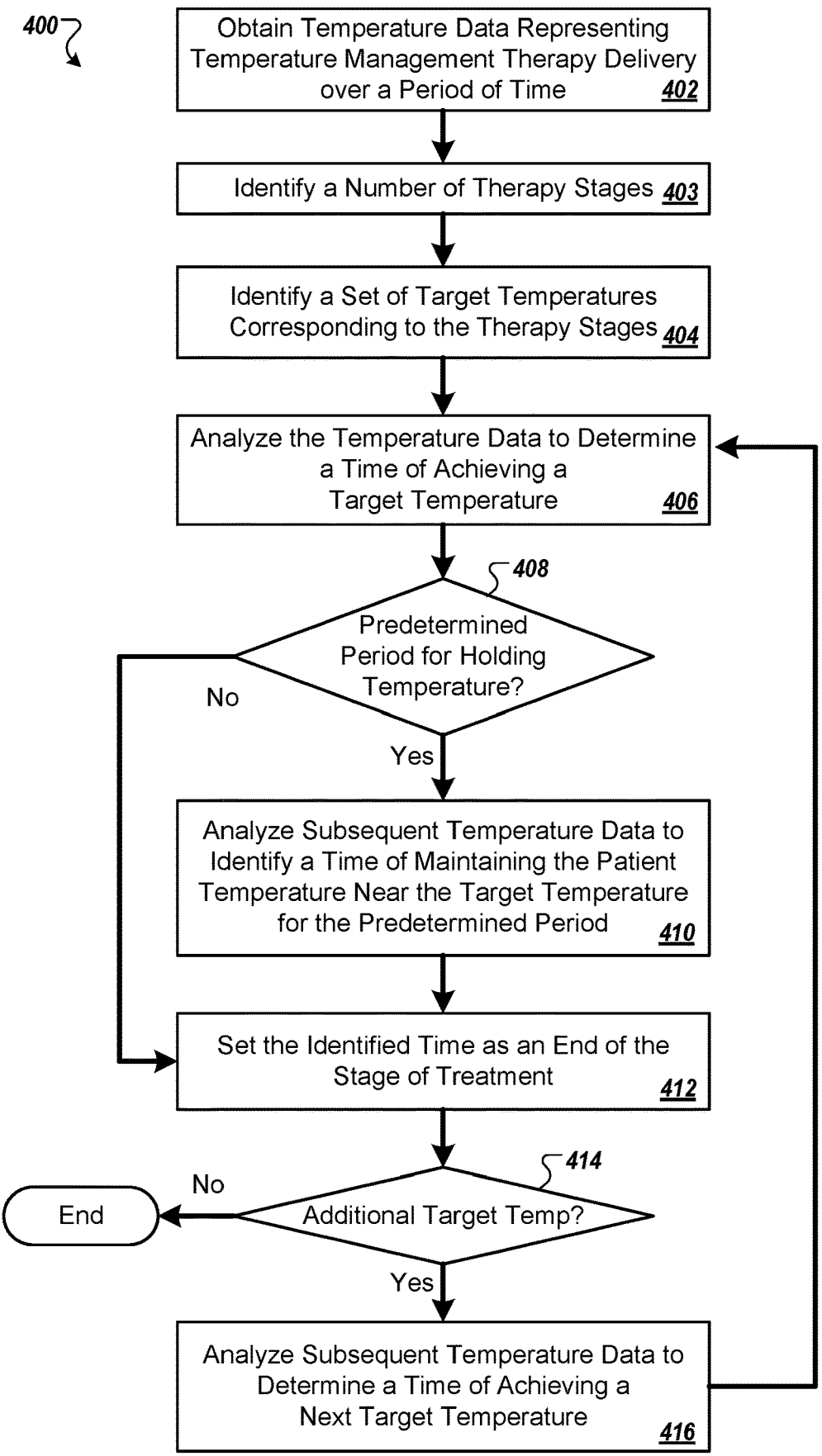
FIG. 4A is a flow chart of an example method for identifying stages of temperature management therapy through temperature data analysis.

FIG. 4A is a flow chart of an example method 400 for identifying stages or phases of temperature management therapy through temperature data analysis. The method 400, for example, may be performed in real-time or near-real-time by a temperature management system, such as the system 800 described below in relation to FIG. 8 or a temperature management control unit 902 described below in relation to FIG. 9. In another example, the method 400 may be performed on historic temperature data from a computing system such as the system 930 described in relation to FIG. 9.

In some implementations, the method 400 begins with obtaining temperature data representing temperature management therapy delivery over a period of time (402). The temperature data, for example, may include the patient temperature data 108, the target temperature data 104, and/or the bath temperature data 106 as described in relation to FIG. 1A. The temperature data may be obtained from a variety of temperature sensors and/or medical devices, such as one or more temperature probes or sensors of a temperature management control unit and/or temperature management delivery device (e.g., an internal device such as an endovascular catheter, a surface device such as a pad, a garment, or a blanket, etc.). In some embodiments, the temperature data is obtained via one or more wireless or wired connections, such as a network data connection to a remote computing system.

In some implementations, a number of therapy stages is identified (403). The number of therapy stages or phases, in some embodiments, corresponds to a number of target temperatures entered at a console or a therapy profile entered at a console. For example, each therapy stage may correspond to one or more target temperatures. The number of therapy stages, in some embodiments, is based at least in part on a mode of the temperature therapy delivery system. The mode, for example, may include warming, cooling, and/or normothermia. The mode, in some examples, may be identified in console settings, a therapy profile, and/or a delta between initial patient temperature and a first target temperature. In some embodiments, the number of therapy stages is based at least in part on a patient type. For example, a neuro patient type may correspond to a different set of therapy stages (e.g., one stage or phase) than a cardiac patient type (e.g., four phases).

In some implementations, a set of target temperatures is identified, each target temperature corresponding to a stage or phase of the temperature management therapy delivery (404). A user may have entered the set of target temperatures into a temperature management control unit to effect temperature management therapy. The set of target temperatures may be included in part of a temperature management therapy profile. The set of target temperatures may include the target temperature at the end of each stage. For example, as illustrated in FIG. 1A, the rewarming stage 102c includes a series of three steps of target temperatures. In this circumstance, the final target temperature (e.g., 37° C.) may be provided in the set of target temperatures.

In some implementations, the temperature data is analyzed to determine a time of achieving a first target temperature of the set of target temperatures (406). In some embodiments, a first indication of reaching or exceeding the first target temperature is determined to be the time for achieving that temperature. Exceeding does not necessarily reference a temperature above the target temperature but, instead, is based on a direction of movement of the patient temperature (e.g., cooling or warming). Since anomalous data readings may exist, in some embodiments determining the first indication of exceeding the first target temperature may be limited to a range of temperatures above (e.g., for warming phases) or below (e.g., for cooling phases) the first target temperature. The range, in some examples, may be within 0.1° C., within 0.2° C., or up to 0.5° C. above the first target temperature. In some embodiments, a rate of change for achieving the target temperature is also set. In these embodiments, for example, the time of achieving the first target temperature may be determined in part on monitoring, for the course of the warming or cooling, the rate of change while the measured temperature moves toward the target temperature.

In some implementations, if a predetermined period of time for holding the target temperature is to be applied (408), subsequent temperature data is analyzed to identify a time period demonstrating maintenance of the patient temperature at or near the target temperature for the predetermined period of time (410). To assure the patient's temperature has reached a point where it is holding the target temperature, for example, additional data points may be analyzed to confirm the patient temperature has achieved the target temperature. The additional data points, in some examples, may be analyzed over a time period of at least two seconds, at least five seconds, at least ten seconds, at least fifteen seconds, at least thirty seconds, at least forty-five seconds, or up to a minute. In some examples, maintenance of a target temperature near the target temperature may include temperatures within 0.1° C., 0.2° C., or 0.5° C. of the target temperature. The range corresponding to "near the target temperature" may be unbalanced, such that temperatures preceding achieving the target temperature must be closer to the target temperature than temperatures going beyond the target temperature. In illustration, if the temperature management therapy phase is an induction phase dropping the patient temperature to 36° C., the range of tolerance may be between 35.5° C. and 36.2° C. As with the example above, anomalous data points, such as a patient temperature at least 1.0° C. different than a preceding temperature, may be ignored during the analysis. In some embodiments, anomalous data points are identified using an algorithm, for example based on change over time. In some examples, temperature movements of greater than about 5 or 6° C. per hour, greater than about 8° C. per hour, or greater than about 10° C. per hour may be discarded as being anomalous. The changes, for example, may be based at least in part on clinically observed rates for heating and/or cooling during temperature management therapy using a particular heat exchange instrument. For example, a certain vascular catheter may be monitored for a first threshold rate of change, while a different vascular catheter may be monitored for a second threshold rate of change. The monitoring for temperature anomalies, in some implementations, is only performed during active temperature management therapy (e.g., not when the system is on standby).

In some embodiments, to determine the end of a phase where the patient's temperature is maintained at a particular temperature, such as the maintenance phase 102b of FIG. 1A, the target temperature for determining the end of the maintenance phase may be derived from a threshold change in bath temperature rather than or in addition to a threshold change in patient temperature. In other embodiments, a manually entered control signal may trigger the beginning of another (e.g., rewarming, cooling) phase, thereby ending the maintenance phase. In this circumstance, the timing of the control signal may be used rather than deriving an end of the maintenance phase through analyzing the temperature data.

In some implementations, whether or not a predetermined period of time was applied for holding the target temperature (408), the identified time is set as the end of the stage of treatment (412). The time, for example, may be registered in a database or other storage medium. In some embodiments, the end of stage time is added to the temperature data set itself, for example as metadata of the temperature data file.

In some implementations, for remaining target temperatures of the set of target temperatures (414), subsequent temperature data is analyzed to determine a time of achieving the next target temperature (416) and used to identify a time of the end of the subsequent stage of treatment (408, 410, 412).

Although illustrated as a particular series of operations, in some implementations, more or fewer operations may be included in the method 400. For example, in some embodiments, power data and/or temperature management delivery device data (e.g., bath temperature, catheter temperature, surface pad temperature, etc.) may be cross-referenced with patient temperature data to refine analysis of the end of each phase of temperature management therapy. In some embodiments, rather than the end of the data file(s) signifying the end of treatment, an end of treatment time is determined. The end of treatment, in some examples, may correspond to a power off signal from the temperature management device, selection via a user interface of the temperature management system indicating a new session with a new patient, or other state information regarding the temperature management device. For example, removal of a catheter type temperature management device from the patient may cause an alert, error, or dramatic change in temperature data indicative of end of the temperature management therapy session. In some embodiments, a type of stage is determined based at least in part on the set of target temperatures. For example, the differences in target temperature may be used to identify a cooling stage (next target temperature is lower than the prior target temperature) versus a warming stage (next target temperature is higher than the prior targe temperature). In other embodiments, the types of stages are deduced from a type of temperature management therapy provided and/or indications of stages provided with the set of target temperatures.

Further, in some implementations, a portion of the operations of the method 400 may be performed in a different order and/or in parallel. For example, the set of target temperatures may be provided to the method 400 with the temperature data (402). Other modifications of the method 400 are contemplated without diverging from the spirit and scope of the method 400.

Figures 1, 4B:
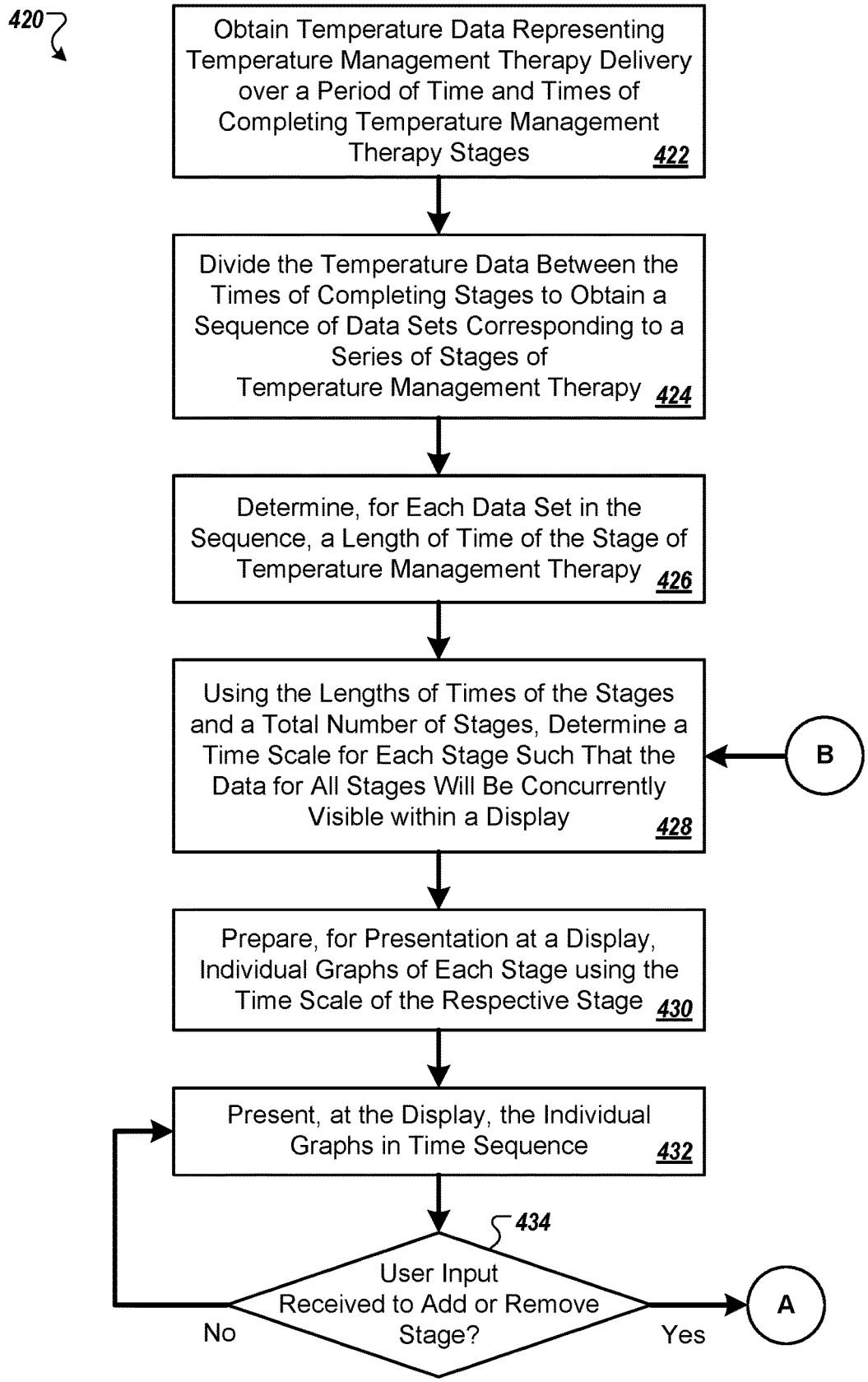
FIG. 4B-1 through FIG. 4B-3 present a flow chart of an example method for dividing temperature data and preparing graphs of each stage of temperature management therapy for user review.
Figures 2, 4B:
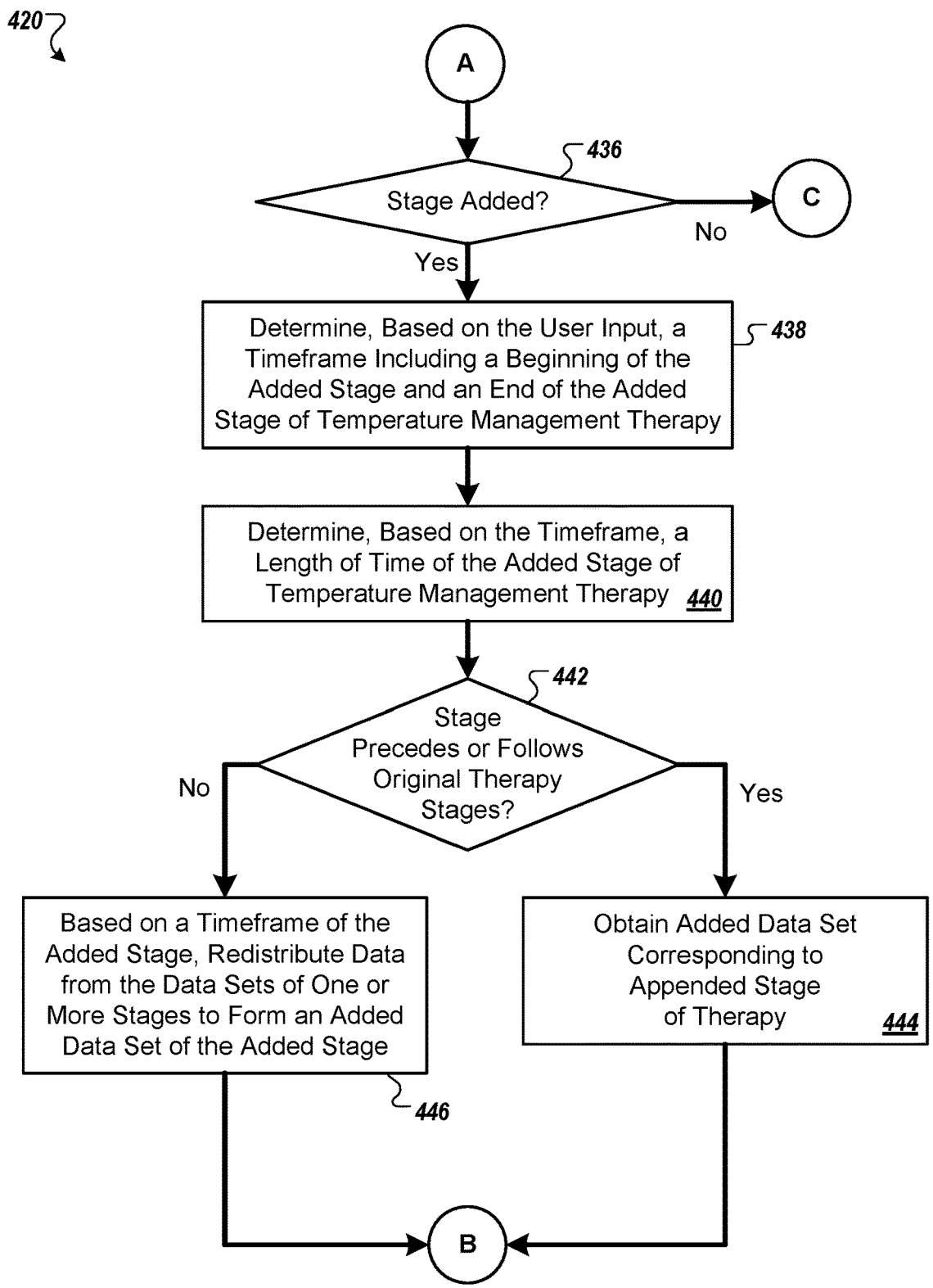
Figures 3, 4B:
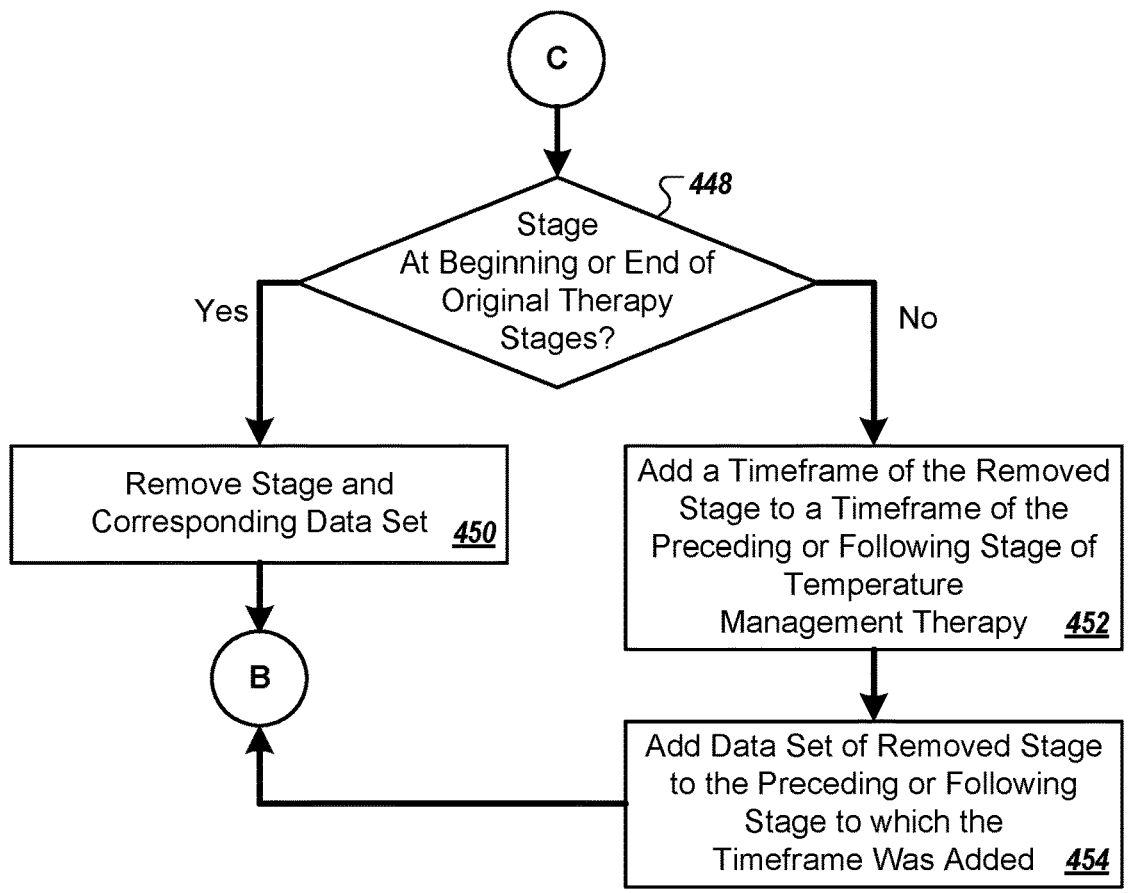

FIG. 4B-1 through FIG. 4B-3 present a flow chart of an example method 420 for dividing temperature data and preparing graphs of each stage of temperature management therapy for user review. The method 420, for example, may be performed in real-time or near-real-time by a temperature management system, such as the system 800 described below in relation to FIG. 8 or a temperature management control unit 902 described below in relation to FIG. 9. In another example, the method 420 may be performed on historic temperature data from a computing system such as the system 930 described in relation to FIG. 9.

Turning to FIG. 4B-1, in some implementations, the method 420 begins with obtaining temperature data representing temperature management therapy delivery over a period of time and a set of times corresponding to completion of temperature management therapy stages (420). The temperature data may include a number of data sets such as, in some examples, patient temperature data, bath temperature data, and/or catheter temperature data. The temperature data and set of times, for example, may be obtained from the method 400 described in relation to FIG. 4A.

In some implementations, the temperature data is divided between the times of stage completion to obtain a sequence of data sets corresponding to a series of stages of temperature management therapy (424). The data sets may be divided, for example, by creating a separate data file for each phase of the temperature management therapy from an original file. In other embodiments, the data sets are logically divided, for example through editing the file itself or identifying a position in the data corresponding to a separate stage.

In some implementations, a length of time of each stage of temperature management therapy is determined (426). Based on the times of completing the temperature management therapy stages, for example, a length of time may be calculated.

In some implementations, using the lengths of times of the stages and a total number of stages, a time scale for each stage is determined, such that the data for all stages will be concurrently visible within a display (428). In some embodiments, the time scale is determined based on each phase being presented in substantially a same size region or footprint of the display. To provide a substantially same size region or footprint, some examples, no single phase will be presented in a region or footprint more than about 5% different, 10% different, or up to 20% different in size than any other phase, such that no one phase dominates the display. The size of graph rendering, in some embodiments, is determined at least in part on one or more features of the end display (e.g., browser-based, smart device based, etc.). The size for rendering a given stage, in some embodiments, is based in part on a level of detail of data for rendering in the display. For example, compressing data of a maintenance phase, where temperatures change very little, may be less challenging than compressing data of a warming or cooling stage. Conversely, where the maintenance stage may be much longer in length (e.g., tens of hours in comparison to under two hours for the induction phase, as illustrated in FIG. 1A), to maintain some level of detail the maintenance phase may be rendered in a wider area than the induction phase.

In some implementations, individual graphs of each stage are prepared for presentation at a display using the time scale of each respective stage (430). To size the data for presentation, in some implementations, the data points may be reduced into a subset of estimated data points representative of temperature change during the phase. In other implementations, the total data points may be reduced through selectively maintaining a subset of the original data points.

In some implementations, the individual graphs are presented at the display in time sequence (432). For example, the individual graphs may be presented as illustrated in FIG. 1A, FIG. 2, FIG. 3A, or FIG. 3B.

If user input is received to add a stage or phase to the graphs presented at the display (434, 436), turning to FIG. 4B-2, in some implementations, based on user input, a timeframe is determined including a beginning of the added stage or phase and an end of the added stage of temperature management therapy (438). A stage may be added, for example, using the reference marker control 306 of FIG. 3A and FIG. 3B to break up presented data into more refined stages than initially presented on the display. For example, the reference marker control 306, upon hovering over, right-clicking, or other selection, may present an option for adding a stage or phase of a particular type. Further, in adding the stage or phase, the user may enter one or more of a type, a target temperature, a start time, an end time, or a total length of time. In this manner, the user may submit the timeframe at the display. In another example, a stage may be added by importing new data for inclusion prior to or subsequent to the displayed temperature management therapy stages. In this manner, the new data may be analyzed to determine the timeframe. In an illustrative example, data may be added that was obtained from a second temperature management system in a circumstance where there was a failure of a first temperature management system during temperature management therapy.

In some implementations, based on the timeframe, a length of time of the added stage of temperature management therapy is determined (440). The length of time, for example, may be derived from a start and end time of the data or a start and end time identified by the user via the user interface.

In some implementations, if the added stage precedes or follows the original set of therapy stages (442), an added data set is obtained corresponding to the appended stage of temperature management therapy (444). For example, the added data set may be imported from other medical equipment such as a separate temperature management system than the system that acquired the originally presented data.

In some implementations, if the added stage is included between adjacent stages of the original set of temperature management therapy stages (442), data from the datasets of one or more of the original therapy stages is redistributed to form an added data set of the added stage (446). As described in relation to creating the data sets, the data may be redistributed to different sets of files, or logical markers may be adjusted. The user input may have identified a type of stage in addition to the time boundaries of the stage.

After adding the temperature management therapy stage (444, 446), in some implementations, turning to FIG. 4B-1, the method 420 returns to determining a time scale for each stage such that the data for all stages will be concurrently visible within the display (428).

If, instead, user input is received to remove a stage from the graphs presented at the display (434, 436), turning to FIG. 4B-3, it is determined whether the stage to be removed is at the beginning or the end of the original set of temperature management therapy stages (448).

If the stage to be removed is the first or the last stage of the original stages of temperature management therapy (448), in some implementations, the stage and its corresponding data set are removed (450) and the method 420 returns to determining a time scale for each stage such that the data for all stages will be concurrently visible within the display (428 of FIG. 4B-1).

If, instead, the stage to be removed is between the first and last stage of the original stages of temperature management therapy (448), in some implementations, a timeframe of the removed stage is added to a timeframe of the preceding or following stage of temperature management therapy (452). For example, as illustrated in the rewarming stage 102c of FIG. 1A, if the original graph had divided the rewarming stage 102c into three separate stages according to the three steps of target temperature, the user may remove two of the stages, thereby adding the timeframe from each of the removed stages to the timeframe of a single rewarming stage.

In some implementations, the data set of the removed stage is added to the preceding or following stage of temperature management therapy to which the timeframe was added (454) and the method 400 returns to determining a time scale for each stage such that the data for all stages will be concurrently visible within the display (428 of FIG. 4B-1). For example, returning to FIG. 1A, if the original graph had divided the rewarming stage into three separate stages according to the three steps of target temperature, the user may remove two of the stages, thereby adding the data from each of the removed stages to the single rewarming stage 102.

Although illustrated as a particular series of operations, in some implementations, more or fewer operations may be included in the method 420. For example, in some embodiments, multiple sets of temperature data and/or other patient data may be identified, such that, prior to beginning of temperature management therapy at the temperature management system, data related to preceding patient treatment may be imported and added as one or more preceding phases to the stages of temperature management therapy. In this manner, when determining the time scale of each stage (428), the timeframe of the preceding data would be factored in. Further, in some implementations, a portion of the operations of the method 420 may be performed in a different order and/or in parallel. For example, in some embodiments, the length of time of each stage of temperature management therapy may be determined (426) prior to dividing the temperature data (424). Other modifications of the method 420 are contemplated without diverging from the spirit and scope of the method 420.

FIG. 5A and FIG. 5B illustrate example case history user interfaces 500, 550 presenting synopses 502a-e of completed temperature management therapy sessions. The user interfaces 500, 550 also includes a search menu 530 for filtering the case synopses 502 and/or finding a particular case synopsis. The user interfaces 500, 550, for example, may be presented to a clinician or other medical organization employee for reviewing and/or editing information regarding temperature management therapy sessions.

Turning to FIG. 5A, each case synopsis 502, as illustrated, includes one or more initial target parameters, or target protocol, of temperature management therapy 504 (e.g., cooling to 36° C., warming to 33° C., normothermia at 36.5° C., etc.), a case identifier 506, a date and time stamp 508 associated with the case, a door (e.g., time of arrival at the medical facility) to initiation of temperature management therapy time 510, a ROSC time 512, and a time to target 516. This information is also included, for example, in the case summary section of the user interface 100 of FIG. 1A. For case synopsis 502c which lacks a ROSC time, a time within range (of target temperature) 524 is included. Further, a cooling or warming rate 518 is presented in some case synopses (502a, 502b, 502d, and 502e). The time within range and cooling/warming rate are presented in the key metrics section 120 of the user interface 100 of FIG. 1A.

As illustrated, each case synopsis 502 includes an application identifier 514, noted as "cardiac arrest" in each case. In some embodiments, the application identifier 514 may indicate fever control, heat-stroke, open-chest surgery, severe burn, hypothermia, spinal trauma, and/or neuro-trauma. Further, each case synopsis 502 includes a patient outcome indicator 520 (e.g., survived, deceased).

Each case synopsis 502, in some implementations, includes a case status 522, each presently labeled "not verified." In some embodiments, the information presented in the synopses 502 (and, correspondingly, in the case overviews such as the case overview 100 of FIG. 1A) is largely automatically derived, such that a clinician or other end user may access the interface 500 to review case histories and to verify the information contained therein. Thus, the information may be edited and verified, for example, prior to being added as a permanent medical record of the facility.

In some implementations, each case synopsis includes a caret 526 for accessing additional overview information. The information, for example, may include information presented in the sections of the user interface 100 of FIG. 1A such as, in some examples, timeline information 140, patient information 132, system information 134, and/or physiological information 136. In some examples, the additional information may include a patient identifier, a patient name or nickname, a device serial number, a shivering status, a presenting rhythm, and/or a no flow time.

Each case synopsis 502, in some implementations, includes an alarm indicator 528 indicating a number of alarms corresponding to the case. For example, as described in relation to FIG. 3B, the alarm indicator may represent the number of alarms 322 that occurred during a particular case.

In some implementations, each case synopsis 502 includes a link control 530 configured to, upon selection, enable the user to link the corresponding case with case data derived from one or more additional medical devices. The linking, in some embodiments, may also be used to link two temperature management therapy cases together. For example, if an equipment failure resulted in replacing a first temperature management system with a second temperature management system, the data from both can be combined through linking the cases via the corresponding link control 530.

Turning to FIG. 5B, in some implementations, the user interface 550 includes a patient type 554 (e.g., cardiac, neuro, other, etc.) rather than the application 514 of FIG. 5A. The patient type, for example, may immediately key personnel into the nature of the emergency.

In some implementations, the user interface 550 includes a door to initiation time 556 in the place of the case status of FIG. 5A. The door to initiation time 556, for example, is a critical metric in ensuring a patient has the best chance for survival, since every minute counts.

The user interface 550, in some implementations, includes a patient nickname 552 identifying the patient to the reviewer. The patient nickname, for example, may provide the user with an easy way to confirm which case history belonged to which patient.

Figure 6A:
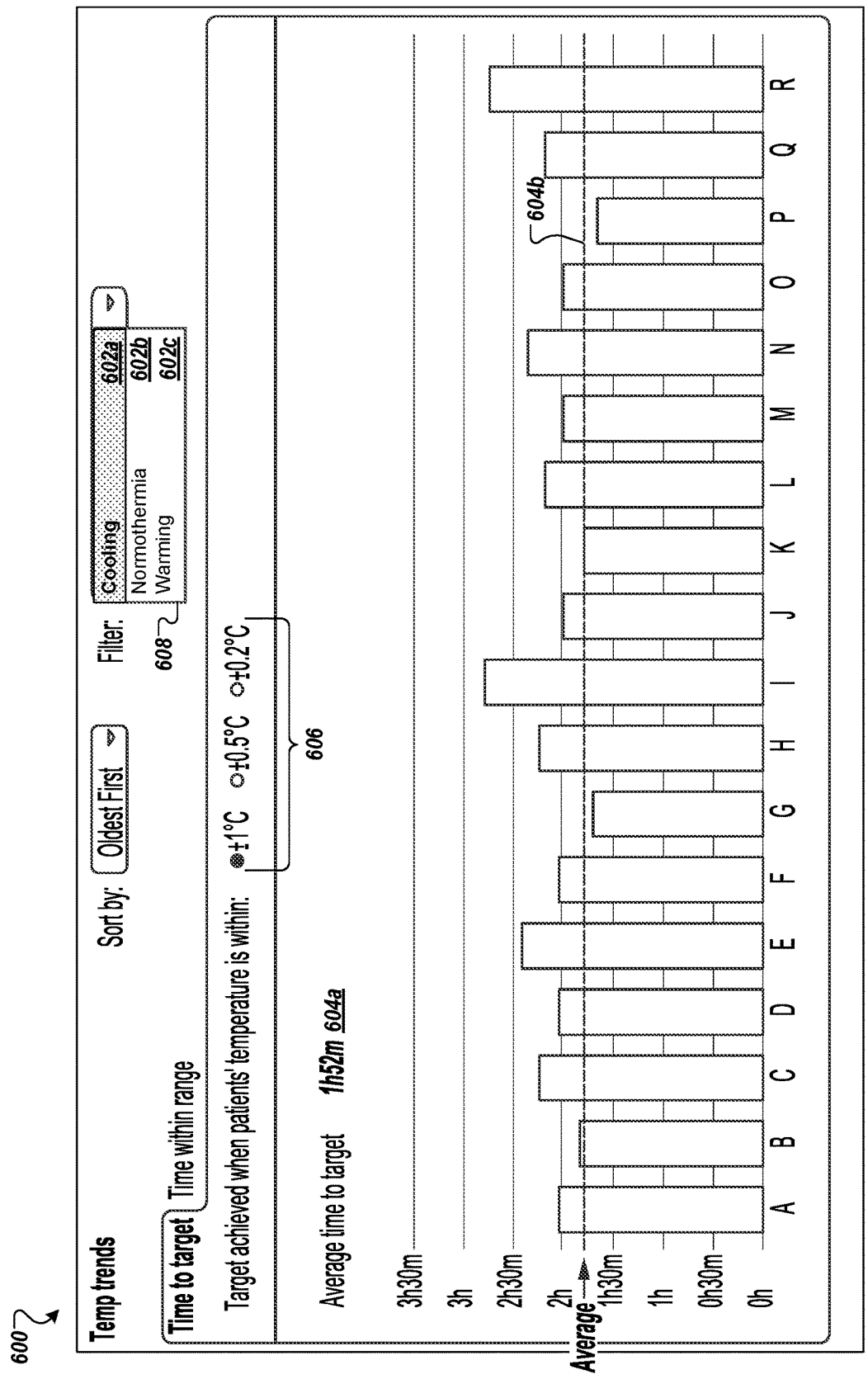
FIG. 6A and FIG. 6B are examples of user interfaces showing comparative analyses of temperature management therapy sessions.
Figure 6B:
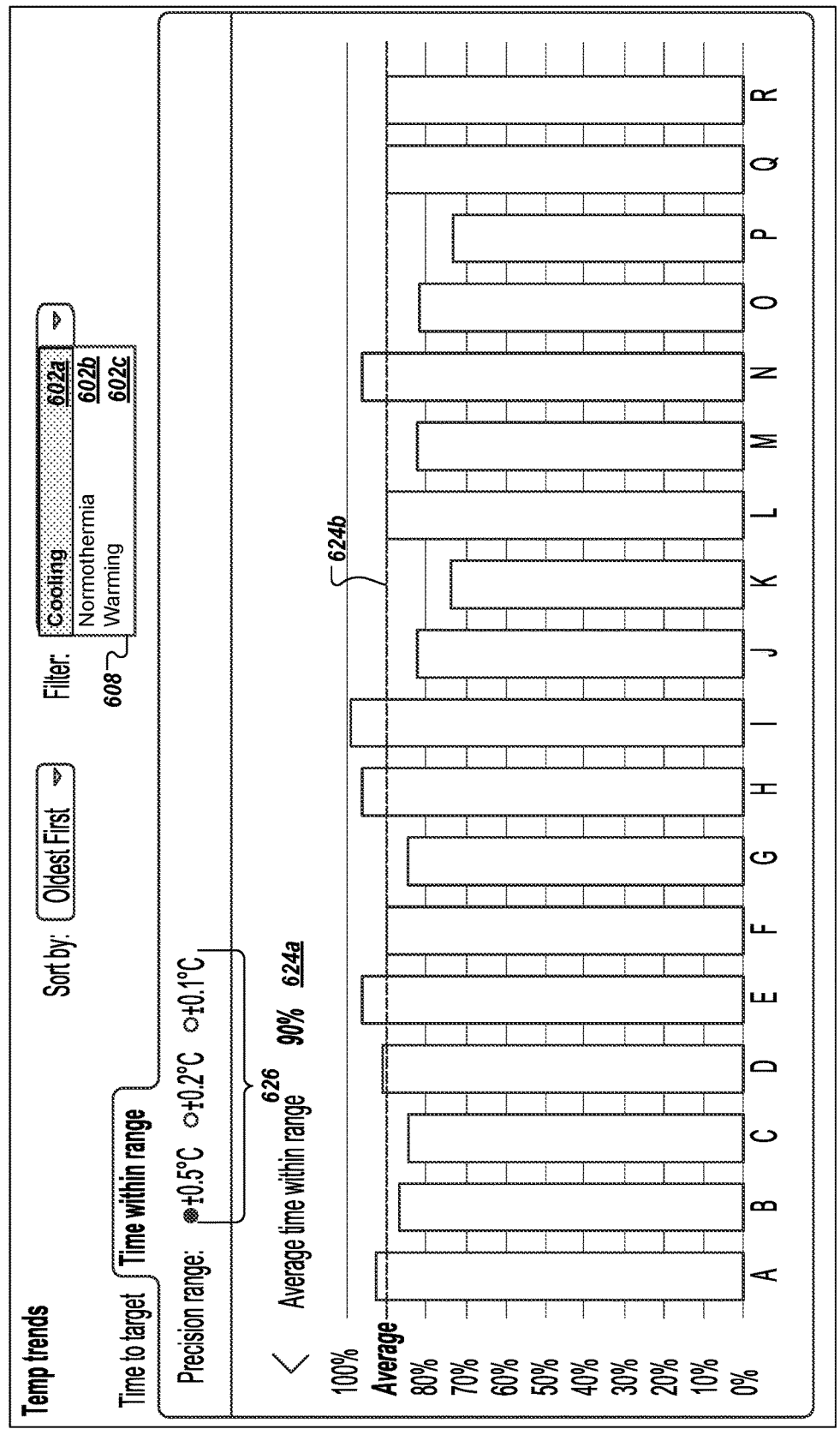

FIG. 6A and FIG. 6B are user interfaces showing example comparative analysis graphs 600, 620 of historic temperature management therapy sessions, also referred to as temperature management trends. The user interfaces are presented for gauging consistency and precision of treatment across multiple cases. Each graph 600, 620 includes a series of bars A through R, each bar corresponding to a different case, such as the cases 506 represented in FIG. 5. In some embodiments, the cases represented in the comparative analysis graphs 600, 620 may be selected using a filter menu such as the status filter 522, the alarm filter 528, the protocol filter 504, and the patient outcome filter 520 represented in FIG. 5.

Turning to FIG. 6A, a time to target temperature bar graph 600 presents, for a set of cases involving a protocol 602a of cooling (e.g., selected via a drop-down menu 608, also including protocol options of normothermia 602b and warming 602c), a set of historic cases A through R ranging in time to target temperature of about 1 hour 40 minutes to about 2 hours 45 minutes. An average time to target temperature 604a is listed as 1 hour 52 minutes, and a corresponding average level 604b is presented across the bar graph. In other embodiments, rather than an average time, a median time, weighted average time, or other combined metric may be used to provide indication of a typical time to target across the representative cases A through R.

The determination of the time of reaching target temperature, in some implementations, is user-selectable via temperature range controls 606. As illustrated, a user has selected (or the user interface has defaulted to) target temperature being achieved when patient temperature is within ±1.0° C. Other options in the temperature range controls 606 include ±0.5° C. and ±0.2° C.

Turning to FIG. 6B, a time within range of target temperature bar graph 620 presents, for the set of cases involving the protocol 602 of cooling to 36° C., a set of historic cases A through R ranging in time within range of target temperature of about 73% to about 98%. An average time within range of target temperature 624a is listed as 90%, and a corresponding average level 624b is presented across the bar graph. In other embodiments, rather than an average time, a median time, weighted average time, or other combined metric may be used to provide indication of a typical time within range of target temperature across the representative cases A through R.

The determination of the time within range of the target temperature, in some implementations, is user-selectable via the temperature precision controls 626. As illustrated, a user has selected (or the user interface has defaulted to) the precision of the patient's temperature being within range of the target temperature as being within ±0.5° C. of the target temperature. Other options in the temperature precision controls 626 include ±0.2° C. and ±0.1° C.

Figure 6C:
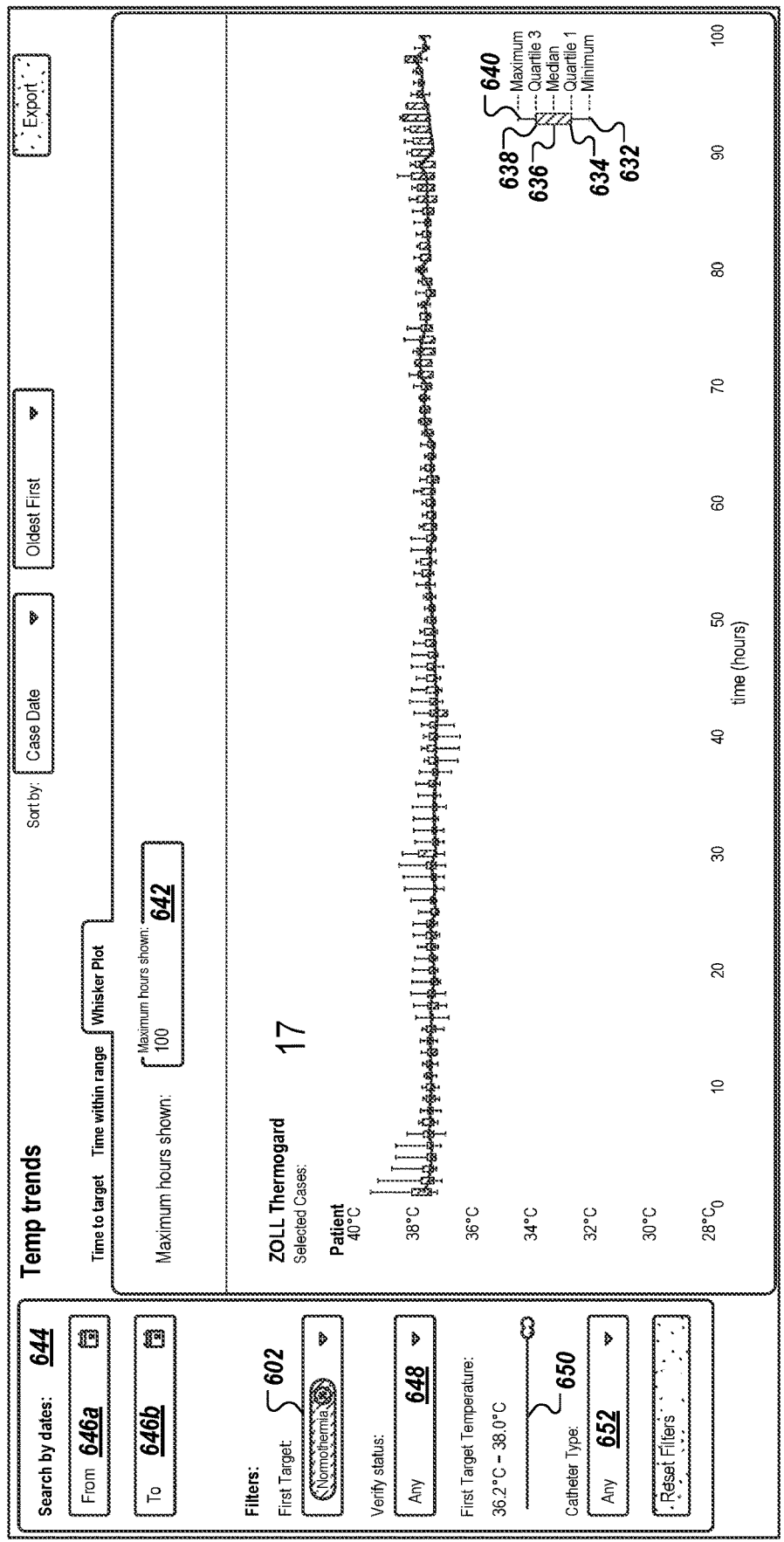
FIG. 6C is an example of a user interface showing a trend analysis graph across a filtered set of cases.

Turning to FIG. 6C, another example of temperature management trend analysis is presented, including a whisker plot 630 of historic temperature management therapy sessions. The whisker plot 630 illustrates comparative patient temperature measurements over a period of time, including a minimum patient temperature 632, a first quartile patient temperature 634, a median patient temperature 636, a third quartile patient temperature 638, and a maximum patient temperature 640 across the patient population for each time sampling (e.g., each hour over a number of hours 642, set to one hundred). The whisker plot can demonstrate, for example, how consistently patient temperature has been controlled throughout time across the patient population.

The patient population, as illustrated, is user-selectable based upon a set of filters 644 including a date range filter 646, the target filter 602, a verify status filter 648, a range of first target temperature 650, and a heat exchange device filter 652. In the example shown, the patient population represents normothermia cases having a first target temperature between 36.2° C. and 38.0° C.

In the whisker plot graph 630 of FIG. 6C, maximum temperature appears relatively tightly controlled from about a $7^{th}$ hour to about a $15^{th}$ hour. A reviewer of the whisker plot graph 630 may wish to apply further filtering to discern variables associated with higher maximum temperatures after the first one or two hours (e.g., lower powered heat exchange devices, difference in first target temperature, etc.). Further, a reviewer may wish to further research why, after the $15^{th}$ hour, maximum temperatures generally rise. This may be because, for example, hospital personnel are disconnecting heat exchange devices and monitoring patients for temperature rise after this time. The data gleaned by a user interfacing with the whisker plot 630, for example, may provide insight into beneficial protocol modifications and/or preferred heat exchange devices to best provide therapy to patients.

In some embodiments, multiple whisker plots of temperature management therapy sessions can be presented for simultaneous review and analysis. In one example, multiple whisker plots may present comparative patient temperature measurements for two or more types of temperature management or heat exchange devices, such as surface and/or catheter-based temperature management or heat exchange devices. In further examples, multiple whisker plots may enable comparative analysis of temperature data across different patient demographics (e.g., gender, age group, etc.), patient types (e.g., neuro, cardiac, etc.), and/or patient outcomes.

In some embodiments, rather than patient temperature, fever metric data (e.g., representing calculations as described in relation to the fever metric 186 of FIG. 1C) is presented for whisker plot analysis. The fever metric data, for example, may demonstrate effectiveness of a type of heat exchange device through selecting the device using the heat exchange device filter 652. A comparative analysis may further be presented between heat exchange devices to compare relative effectiveness in maintaining patient temperature below fever range during a selected target treatment 602. In some embodiments, filters may be provided to conduct fever metric data analysis to compare outcomes in view of different patient genders, patient types (e.g., neuro, cardiac, etc.), patient outcomes, patient age groups, and/or temperature management devices or heat exchange devices. The patient outcomes, in some examples, may include outcomes defined using one or more of cerebral performance category (CPC), modified Rankin Scale (mRS), Glasgow Outcome Scale (GOS), and/or Barthel Index (BI).

Additionally, as discussed in relation to FIG. 1C, a below temperature threshold metric (e.g., hypothermia metric) may be analyzed in a similar manner as the fever metric data to review relative effectiveness of types of heat exchange devices in warming a hypothermic patient.

Figure 7:
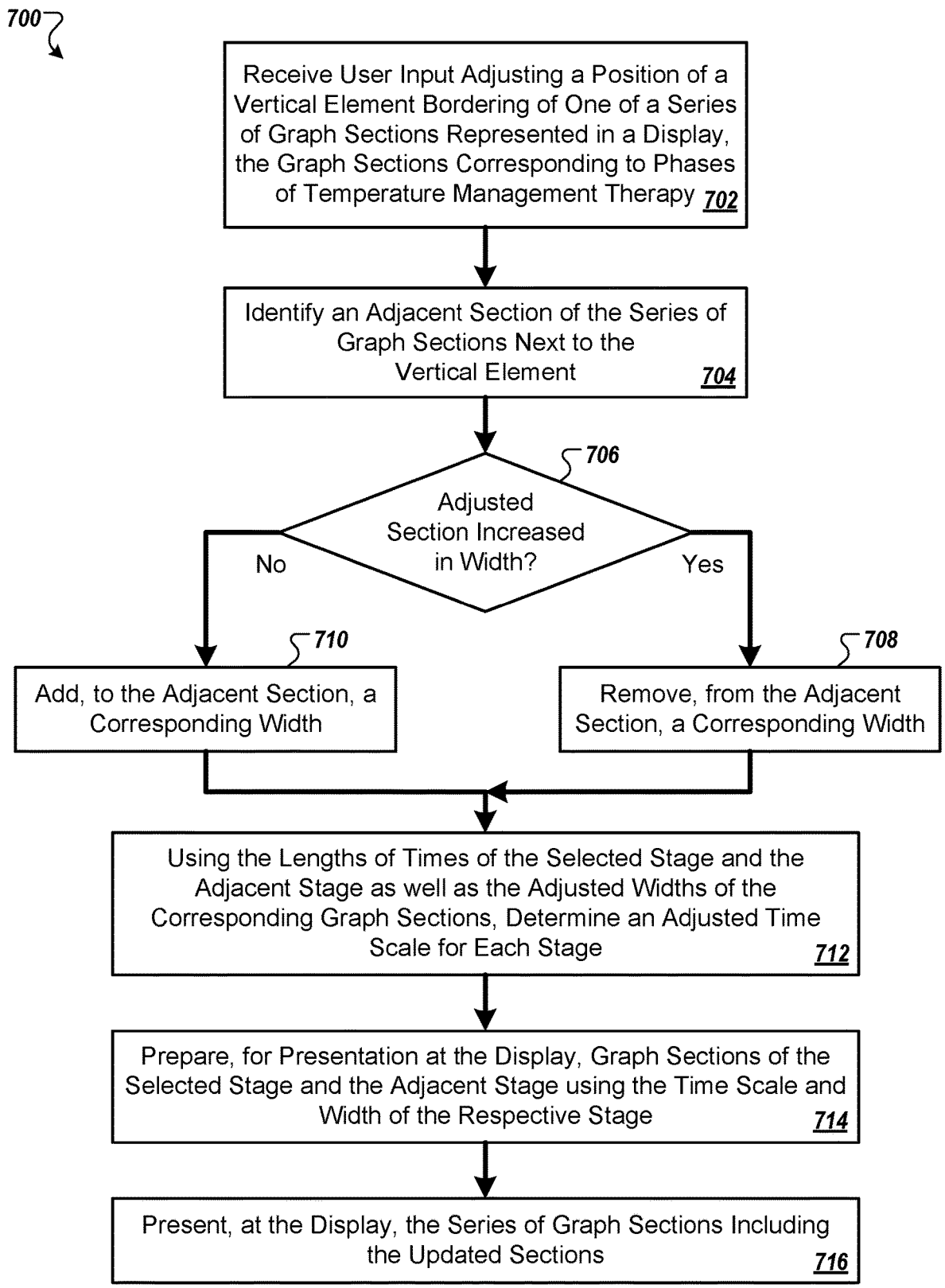
FIG. 7 is a flow chart of an example method for automatically adjusting graphs of stages of temperature management therapy based on user input.

FIG. 7 is a flow chart of an example method 700 for automatically adjusting graphs of stages of temperature management therapy based on user input. The method 700, for example, may be performed in real-time or near-realtime by a temperature management system, such as the system 800 described below in relation to FIG. 8 or a temperature management control unit 902 described below in relation to FIG. 9. In another example, the method 700 may be performed on historic temperature data from a computing system such as the system 930 described in relation to FIG. 9. The method 700 may be performed on the user interface 100 of FIG. 1A, the user interface 200 of FIG. 2, the user interface 300 of FIG. 3A, and/or the user interface 320 of FIG. 3B.

In some implementations, the method 700 begins with receiving user input adjusting a position of a vertical element bordering one of a series of graph sections represented in a display, the graph segments corresponding to phases of temperature management therapy (702). The vertical element, for example, may be one of the vertical edges of the graph segments 114 illustrated in FIG. 1A, FIG. 2, FIG. 3A, and FIG. 3B.

In some implementations, an adjacent section of the series of graph sections is identified (704). For example, turning to FIG. 1A, if the right vertical edge of graph section 114a is adjusted, the left vertical edge of graph section 114b would be the adjacent section Returning to FIG. 7, in some implementations, if the user input adjusts a graph section to increase a width of the graph section (706), a corresponding width is removed from the adjacent graph section (708). In other words, if the user chooses to increase the width of graph section 114a, the width of graph section 114b will be reduced by a corresponding amount.

Conversely, if the user input adjusts the graph section to decrease the width of the graph section (706), in some implementations, a corresponding width is added to the adjacent graph section (710). In illustration, turning to FIG. 1A, if the right edge of the graph section 114b is adjusted toward the left, the graph section 114c will gain a corresponding width.

Returning to FIG. 7, in some implementations, an adjusted time scale for each stage is determined using the lengths of times of the selected stage and the adjacent stage as well as the adjusted widths of the corresponding graph sections (712). The time scale, for example, may be adjusted as described in relation to FIG. 4A.

In some implementations, graph sections of the selected stage and the adjacent stage are prepared for presentation at the display using the timescale and width of each respective stage (714). The graph sections may be prepared for display, for example, as discussed in the method 420 of FIG. 4B-1.

In some implementations, the series of graph sections, including the updated sections, are presented at the display (716).

Although illustrated as a particular series of operations, in some implementations, more or fewer operations may be included in the method 700. For example, in other embodiments, rather than removing all of the gained width from the adjacent graph section, each of the remaining sections (114b, 114c, and 114d) may be adjusted such that the adjacent graph section 114b is not substantially obscured by increasing the size of graph section 114a, in an illustrative example. Further, in some implementations, a portion of the operations of the method 700 may be performed in a different order and/or in parallel. Other modifications of the method 420 are contemplated without diverging from the spirit and scope of the method 700.

Figure 8:
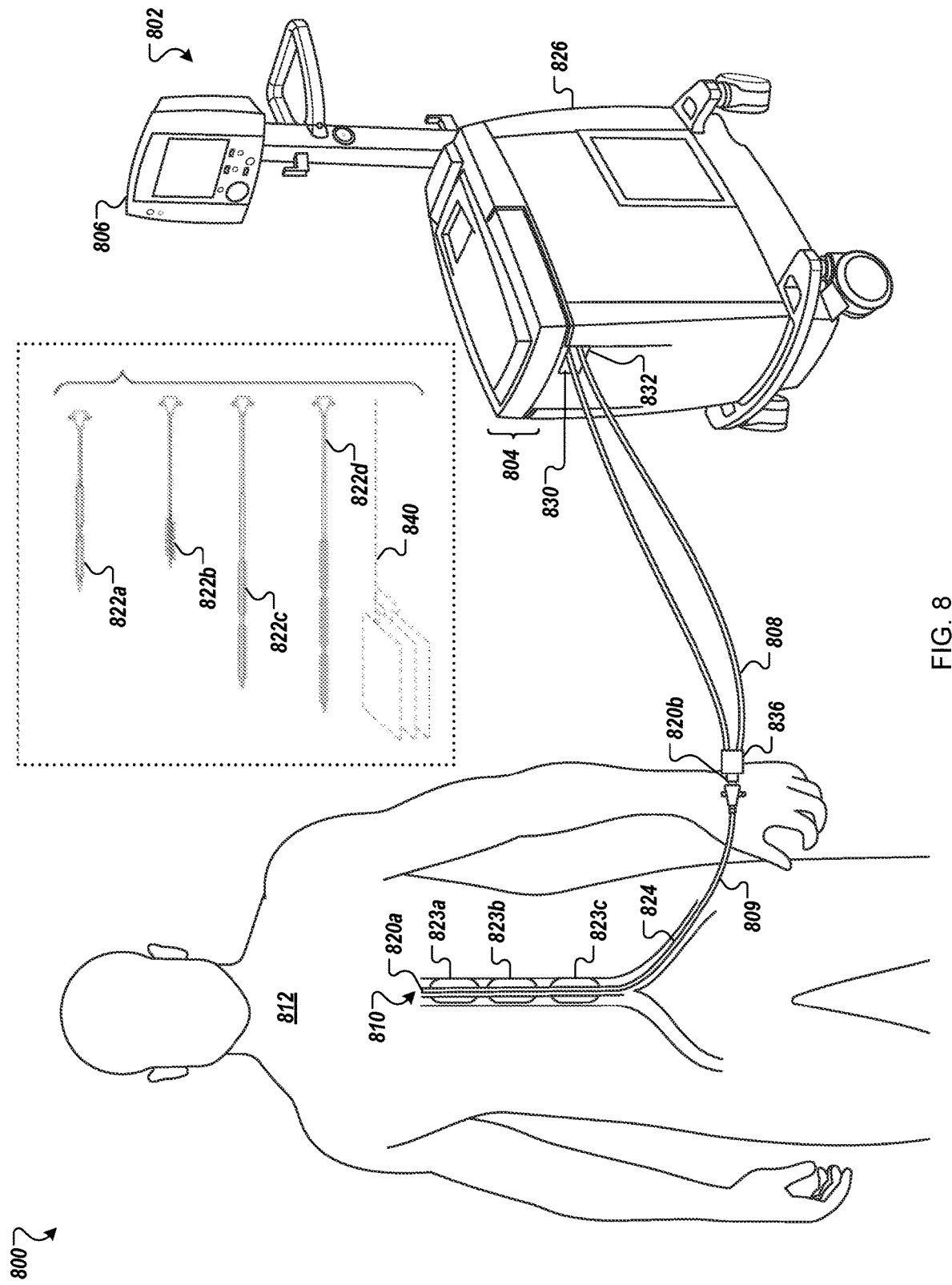
FIG. 8 is a diagram of an example temperature management system.

FIG. 8 is a diagram of an example temperature management system 800. The temperature management system 800 is configured to control a temperature of a patient's body 812 using a heat exchange device 810. The temperature management system 800 may be configured to heat and/or cool the patient 812 to manage the temperature of the patient 812. Managing the temperature of the patient 812 may be referred to as heat exchange treatment of the patient, temperature management therapy of the patient, heating/warming treatment of the patient, or cooling treatment of the patient.

The heat exchange device 810, in some embodiments, is an intravascular heat exchange catheter configured to be inserted into a vasculature of the patient 812. Heat exchanger catheters interoperable with the temperature management system 800, in some examples, can include a heat exchange catheter 822a commercially available as the Cool Line® Catheter (ZOLL Circulation, Inc., San Jose, Calif.), a heat exchange catheter 822b commercially available as the Solex 7® Catheter (ZOLL Circulation, Inc., San Jose, Calif.), a heat exchange catheter 822c commercially available as the Icy® Catheter (ZOLL Circulation, Inc., San Jose, Calif.), and/or a heat exchange catheter 822d commercially available as the Quattro® Catheter (ZOLL Circulation, Inc., San Jose, Calif.).

In other embodiments, the heat exchange device 810 includes a heat exchanger configured to be applied to the surface of the patient 812, such as a heat exchange pad (e.g., heat exchanger pad 840), a heat exchanger blanket, or a heat exchanger garment. The temperature management system 800 can include other hardware configured for heating and/or cooling the patient 812 such as, in some examples, heat exchange fluid loops, heating or cooling plates, heating or cooling cassettes, and/or heat exchange baths. The temperature management system 800, in some embodiments, is configured to measure patient data representing one or more physiological parameters of the patient, such as patient temperature, during treatment of the patient.

The temperature management system 800, in some implementations, includes an extracorporeal control console 802 with an interface 804 providing a coupling between the heat exchange device 810 and the control console 802 via a heat exchange fluid loop including tubing 808. The temperature management system 800 may be configured to control the temperature of the patient's body 812 based on operational data (e.g., pump speed, coolant temperature, and power) of the control console 802 and/or patient data (e.g., patient temperature feedback received from one or more temperature sensors located in or on the patient, such as temperature sensors 820a and/or 820b). The operational data and the patient data that are measured during treatment of the patient 812 may be referred to as treatment data.

In some implementations, the heat exchange device 810 couples to the control console 802 via a connector 836 connecting the tubing 808 to inflow and outflow tubes 809 of the heat exchange device 810. In some embodiments, the temperature management system 800 includes one or more single use elements, such as the tubing 808 of the fluid loop and/or the temperature sensors 820a, 820b.

As illustrated, the heat exchange device 810 includes an elongate catheter body and a heat exchanger 823a-c positioned on a distal portion of the catheter body. The heat exchanger 823a-c, in some examples, may include an inflatable cylindrical balloon, a serpentine balloon or tubing, or a helical balloon or tubing through which thermal exchange fluid circulates. Inflow and outflow lumens (not illustrated) are present within the catheter body to facilitate circulation of the thermal exchange fluid through the elongate catheter body. The catheter body may include one or more working lumens 824 extending through the catheter body and terminating distally at one or more openings in the distal end of the catheter body. The working lumens 824 may serve, for example, as a guidewire lumen to facilitate insertion and positioning of the catheter. In another example, the working lumens 824 may be used after insertion of the catheter for delivery of fluids, medicaments or other devices. In illustration, the temperature sensor 820*a* may be inserted through the working lumen 824 and advance out of the distal end opening to a location beyond the distal end of the catheter body.

The extracorporeal control console 802 includes, generally, a main housing 826 and a console head including a user interface 806. The main housing 826 may contain various apparatuses and circuitry for warming/cooling thermal exchange fluid such as, in some examples, coolant, refrigerant, and/or saline. The main housing 826 may also include apparatuses and circuitry for pumping the thermal exchange fluid through the thermal exchange device 810 to effectively modify and/or control the patient's body temperature. The housing 826 may further include connection ports 830 and 832 for connection of additional or alternative types of temperature sensors and/or other apparatuses.

In some implementations, the user interface 806 is configured for accepting input data or control signals to the temperature management system 800 and for presenting information, such as treatment data indicative of treatment of the patient 810, to a clinician or other user. The user interface 806 may include a display screen, one or more physical controls, and/or virtual controls of a touch screen system. The temperature management system 800 may be configured to display, at the user interface 806, an operational status of the temperature management system 800 and a physiological status of the patient 812 during temperature management therapy. The operational status can include whether the temperature management system 800 is working at a maximum cooling or heating power (e.g., work or effort) or a percentage of the maximum heating or cooling power. In some embodiments, the user interface 806 is configured to display a stage of temperature management therapy (e.g., a treatment cycle or treatment process) being performed on the patient. As described above, each treatment period of the temperature management therapy may be associated with a target patient temperature, a rate of cooling or heating the patient 812 to control the patient temperature to the target temperature, one or more system modes, and/or the system operating to lower, raise, or maintain the patient's temperature, e.g., by cooling or warming the patient. As described above, the user interface may include a visual representation of the treatment, including one or more sections, each section corresponding to a treatment period or stage.

Figure 9:
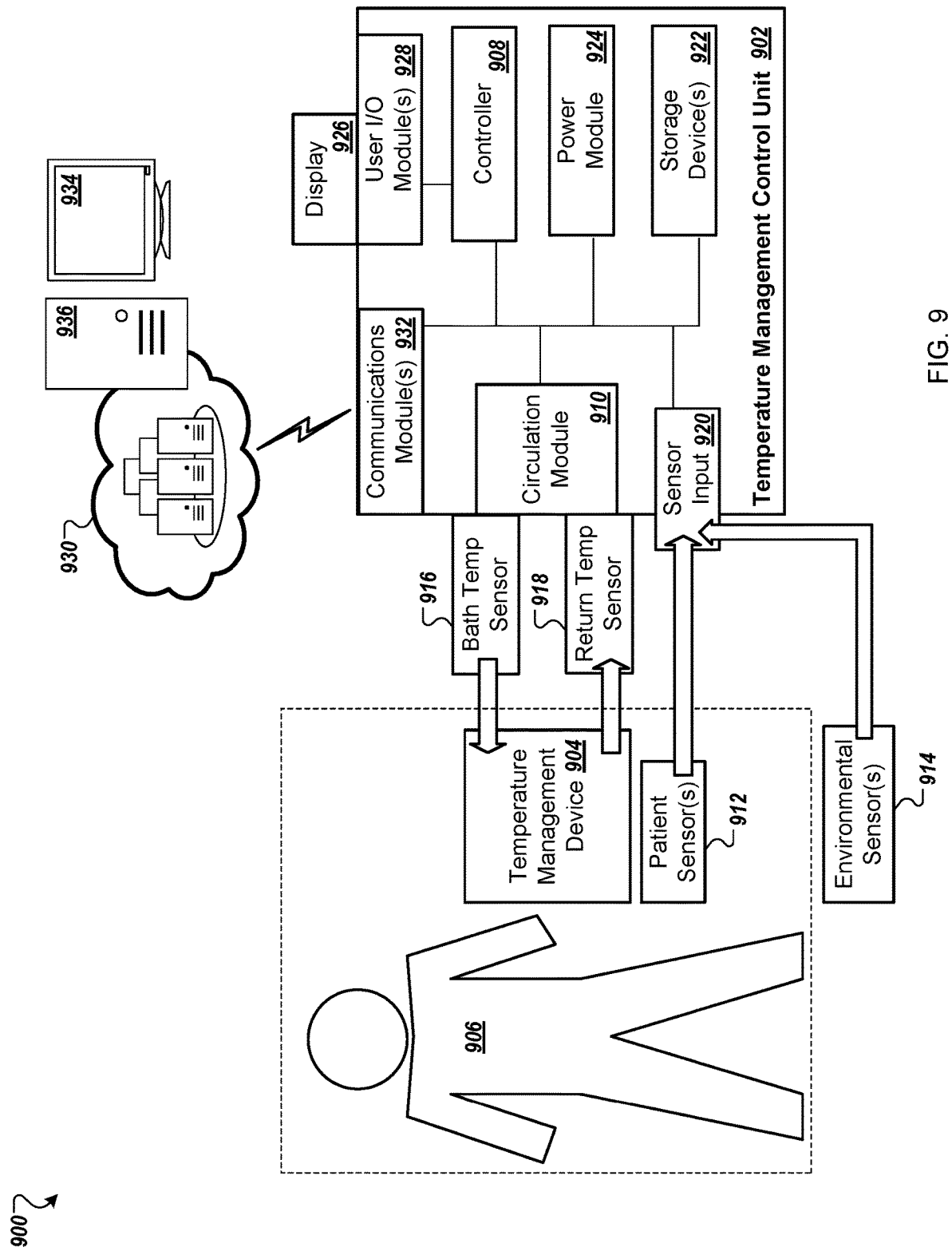
FIG. 9 is a block diagram of example systems and communications interfaces for temperature management therapy.

FIG. 9 is a block diagram of an example temperature management system 900 including a temperature management control unit 902 functioning in coordination with a temperature management device 904 to provide temperature management therapy to a patient 906. In use, a controller 908 of the temperature management control unit 902 controls a circulation module 910 to provide hypothermia or normothermia temperature management therapy. The controller 908 may receive feedback from a variety of sensors, such as one or more patient sensors 912 and/or environmental sensors 914. The patient sensors 912 may include one or more patient temperature probes. Further, in the circumstance that the temperature management device 904 is liquid-controlled, the circulation module 910 may include or be in communication with a bath temperature sensor 916 and/or a liquid return temperature sensor 918. The controller 908 may analyze the sensor feedback (e.g., from the circulation module 910, via a sensor input module 920, and/or stored over time to storage device(s) 922), for example, to detect the onset of fever in the patient 906, leading the controller to instructing the circulation module 910 to provide additional cold, or colder, fluid, to the temperature management device 904.

In some implementations, the controller receives feedback from a power module 924 and an associated increase in the energy being drawn through the power module 924 by a cooler/heater unit of the circulation module 910.

In illustration, when the temperature management control unit 902 is being utilized for maintenance of controlled hyperthermia, the onset of fever in the patient 906 by the patient sensors 912 may be detectable as a need to decrease or cease fluid warming to the temperature management device 904 via the circulation module 910, thereby creating and an associated decrease in the energy expenditure of the power module 924.

Temperature data (e.g., related to sensor inputs 916, 918, and/or 920), in some implementations, is analyzed by the controller 908 to provide information to a user of the temperature management control unit 902 at a display 926. For example, the controller 908, via user input/output (I/O) module(s) 928, may present patient information such as a current patient temperature, a target temperature, a setting of the temperature management control unit 902 (e.g., cooling, warming, maintenance), and/or a power level may be presented as data to assist clinicians. In illustration, at least a portion of the information presented in FIG. 1A, FIG. 2, FIG. 3A, and/or FIG. 3B may be presented at the display 926.

In some implementations, temperature data is provided to a remote computing device or system via one or more communication modules 932. The communication modules 932, in some examples, may be configured to establish wired or wireless communication links under a variety of communication standards. The communications may be secure and/or the information provided via the communication module(s) 932 may be encrypted. In one example, the communications module(s) 932 may be configured to communicate via a secure medical facility network. In another example, the communications module(s) 932 may be configured to communicate via a wireless data transfer interface such as a cellular data communication interface. The computing devices connecting to the communication module(s) 932 may include, in some examples, a tablet computer in wireless communication with the temperature management control unit 902, a separate medical device in wired or wireless communication with the temperature management control unit 902, or a networked server or server system (e.g., cloud computing system) such as the system 930.

The system 930, in some implementations, collects temperature data and/or sensor data from the sensors 912, 914, 916, and/or 918 to provide metrics and analysis of temperature management therapy. The analysis may be performed in near-real time and/or using historical data (e.g., at the end of each stage of temperature management therapy or at the end of a temperature management therapy session). The analysis may be presented in graphs, tables, and other metrics displays, such as is found in example user interfaces of FIG. 1A, FIG. 2, FIG. 3A, and FIG. 3B, at a display 934 of a user computing device 936.

In some embodiments, the system 930 collects data from multiple temperature management control units to present comparative analysis, such as the case histories presented in the user interface 500 of FIG. 5. For example, as illustrated in FIG. 6A and FIG. 6B, the system 930 may present comparative metrics regarding achieving and/or maintaining a target temperature during temperature management therapy.

The system 930, in some implementations, enhances data displayed at the display 926 of the temperature management control unit 902. For example, the system 930 may provide additional information to the temperature management control unit 902, such as patient information, historic event data (e.g., collected prior to the patient 906 being treated using the temperature management control unit 902), and/or historic temperature data (e.g., from a different temperature management control unit 902 used to treat the patient 906).

Reference has been made to illustrations representing methods and systems according to implementations of this disclosure. Aspects thereof may be implemented by computer program instructions. These computer program instructions may be provided to a processor of a general-purpose computer, special purpose computer, or other programmable data processing apparatus and/or distributed processing systems having processing circuitry, such that the instructions, which execute via the processor of the computer or other programmable data processing apparatus, create means for implementing the functions/operations specified in the illustrations.

One or more processors can be utilized to implement various functions and/or algorithms described herein. Additionally, any functions and/or algorithms described herein can be performed upon one or more virtual processors. The virtual processors, for example, may be part of one or more physical computing systems such as a computer farm or a cloud drive.

Aspects of the present disclosure may be implemented by software logic, including machine readable instructions or commands for execution via processing circuitry. The software logic may also be referred to, in some examples, as machine readable code, software code, or programming instructions. The software logic, in certain embodiments, may be coded in runtime-executable commands and/or compiled as a machine-executable program or file. The software logic may be programmed in and/or compiled into a variety of coding languages or formats.

Aspects of the present disclosure may be implemented by hardware logic (where hardware logic naturally also includes any necessary signal wiring, memory elements and such), with such hardware logic able to operate without active software involvement beyond initial system configuration and any subsequent system reconfigurations (e.g., for different object schema dimensions). The hardware logic may be synthesized on a reprogrammable computing chip such as a field programmable gate array (FPGA) or other reconfigurable logic device. In addition, the hardware logic may be hard coded onto a custom microchip, such as an application-specific integrated circuit (ASIC). In other embodiments, software, stored as instructions to a non-transitory computer-readable medium such as a memory device, on-chip integrated memory unit, or other non-transitory computer-readable storage, may be used to perform at least portions of the herein described functionality.

Various aspects of the embodiments disclosed herein are performed on one or more computing devices, such as a laptop computer, tablet computer, mobile phone or other handheld computing device, or one or more servers. Such computing devices include processing circuitry embodied in one or more processors or logic chips, such as a central processing unit (CPU), graphics processing unit (GPU), field programmable gate array (FPGA), application-specific integrated circuit (ASIC), or programmable logic device (PLD). Further, the processing circuitry may be implemented as multiple processors cooperatively working in concert (e.g., in parallel) to perform the instructions of the inventive processes described above.

The process data and instructions used to perform various methods and algorithms derived herein may be stored in non-transitory (i.e., non-volatile) computer-readable medium or memory. The claimed advancements are not limited by the form of the computer-readable media on which the instructions of the inventive processes are stored. For example, the instructions may be stored on CDs, DVDs, in FLASH memory, RAM, ROM, PROM, EPROM, EEPROM, hard disk or any other information processing device with which the computing device communicates, such as a server or computer. The processing circuitry and stored instructions may enable the computing device to perform, in some examples, the method 400 of FIG. 4A, method 420 of FIG. 4B-1 through FIG. 4B-3, method 700 of FIG. 7.

These computer program instructions can direct a computing device or other programmable data processing apparatus to function in a particular manner, such that the instructions stored in the computer-readable medium produce an article of manufacture including instruction means which implement the function/operation specified in the illustrated process flows.

Embodiments of the present description rely on network communications. As can be appreciated, the network can be a public network, such as the Internet, or a private network such as a local area network (LAN) or wide area network (WAN) network, or any combination thereof and can also include PSTN or ISDN sub-networks. The network can also be wired, such as an Ethernet network, and/or can be wireless such as a cellular network including EDGE, 3G, 4G, and 5G wireless cellular systems. The wireless network can also include Wi-Fi®, Bluetooth®, Zigbee®, or another wireless form of communication. The network, for example, may support communications between one or more of the patient sensors 912 and the temperature management control unit 902, the temperature management control unit 902, one or more of the and/or environmental sensors 914 and the temperature management control unit 902, and/or the temperature management control unit 902 and the computing system 930 of FIG. 9.

The computing device, in some embodiments, further includes a display controller for interfacing with a display, such as a built-in display or LCD monitor. A general purpose I/O interface of the computing device may interface with a keyboard, a hand-manipulated movement tracked I/O device (e.g., mouse, virtual reality glove, trackball, joystick, etc.), and/or touch screen panel or touch pad on or separate from the display. The display controller and display may enable presentation of the user interfaces illustrated, in some examples, in FIG. 1A, FIG. 2, FIG. 3A, FIG. 3B, FIG. 5A, FIG. 5B, FIG. 6A, and/or FIG. 6B.

Moreover, the present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry or based on the requirements of the intended back-up load to be powered.

The functions and features described herein may also be executed by various distributed components of a system. For example, one or more processors may execute these system functions, where the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system, in some examples, may be received via direct user input and/or received remotely either in real-time or as a batch process.

Although provided for context, in other implementations, methods and logic flows described herein may be performed on modules or hardware not identical to those described. Accordingly, other implementations are within the scope that may be claimed.

In some implementations, a cloud computing environment, such as Google Cloud Platform™ or Amazon™ Web Services (AWS™), may be used perform at least portions of methods or algorithms detailed above. The processes associated with the methods described herein can be executed on a computation processor of a data center. The data center, for example, can also include an application processor that can be used as the interface with the systems described herein to receive data and output corresponding information. The cloud computing environment may also include one or more databases or other data storage, such as cloud storage and a query database. In some implementations, the cloud storage database, such as the Google™ Cloud Storage or Amazon™ Elastic File System (EFS™), may store processed and unprocessed data supplied by systems described herein. For example, the contents of storage regions of the computing system 930 may be maintained in a database structure.

The systems described herein may communicate with the cloud computing environment through a secure gateway. In some implementations, the secure gateway includes a database querying interface, such as the Google BigQuery™ platform or Amazon RDS™. The data querying interface, for example, may support access by the search menu 540 of FIG. 5A and FIG. 5B.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A temperature management system for delivering a temperature management therapy to a patient, the system comprising:
  a temperature management device configured to control temperature of a patient;
  at least one sensor configured to generate temperature data indicative of a treatment temperature; and
  operations encoded in at least one of i) hardware logic or ii) software logic stored to a non-volatile computer readable medium and configured to be executed on processing circuitry, the operations comprising
  delivering temperature management therapy to the patient, wherein the temperature management therapy comprises a plurality of phases, each phase comprising one or more parameters, wherein
  delivering comprises, over a period of time of each phase of the plurality phases, controlling a temperature of the temperature management device to adjust the temperature of the patient in accordance with the one or more parameters of the respective phase, and
  based on the temperature data of the at least one sensor, preparing, for presentation at a display of a computing device, a case overview comprising at least one graph of treatment temperature versus time, wherein
  the at least one graph comprises a respective timespan of each phase of the plurality of phases, and
  preparing the at least one graph for presentation at the display comprises
  dividing the temperature data into a plurality of temperature data sets, each temperature data set corresponding to a respective phase of the plurality of phases,
  fitting each phase of the plurality of phases to substantially a same size footprint within the display, such that the at least one graph is configured for simultaneous presentation of the timespans of the plurality of phases at the display, wherein fitting comprises
  compressing the respective timespan of the temperature data set of at least one phase of the plurality of phases into a different time scale than a respective time scale of at least one other phase of the plurality of phases while retaining data complexity by selectively maintaining a subset of original data points of the temperature data set of the plurality of temperature data sets corresponding to the at least one phase, and
  applying a same temperature scale to each phase of the plurality of phases such that, when presented at the display as the at least one graph, the plurality of phases are substantially contiguous.

2. The system of claim 1, wherein preparing comprises visually distinguishing each phase of the plurality of phases.

3. The system of claim 1, wherein the temperature management therapy is a hypothermia therapy.

4. The system of claim 1, wherein the plurality of phases comprises an induction phase, a maintenance phase, a rewarming phase, and a normothermia phase.

5. The system of claim 1, wherein the temperature management therapy is a hyperthermia therapy.

6. The system of claim 5, wherein the plurality of phases comprises an induction phase, a maintenance phase, a cooling phase, and a normothermia phase.

7. The system of claim 1, wherein the one or more parameters comprise at least one of a target temperature, a rate of temperature change, or a target duration.

8. The system of claim 1, wherein the at least one graph comprises a series of graphs, each graph of the series of graphs corresponding to a different phase of the plurality of phases.

9. The system of claim 8, wherein preparing the at least one graph for presentation at the display comprises configuring positions of the series of graphs to present a substantially contiguous graph of temperature data versus time.

10. The system of claim 1, wherein compressing the respective timespan of the temperature data set of at least one phase comprises reducing a plurality of data points of the respective temperature data set of each phase of the at least one phase into a portion of data points representative of temperature change during the respective phase.

11. The system of claim 1, wherein compressing the respective timespan of the temperature data set of at least one phase comprises reducing a plurality of data points of the respective temperature data set of each phase of the at least one phase into a plurality of estimated data points representative of temperature change during the respective phase.

12. The system of claim 1, wherein the at least one graph comprises one or more vertical separation elements, wherein adjacent phases of the plurality of phases are separated in the at least one graph by at least one vertical separation element of the one or more vertical separation elements.

13. The system of claim 12, wherein the operations comprise:
receiving user input indicating adjustment of a position of a selected vertical separation element of the one or more vertical separation elements to an adjusted position; and
resizing each phase of the adjacent phases separated by the selected vertical separation element in accordance with the adjusted position.

14. The system of claim 13, wherein resizing comprises determining an adjusted time scale for each phase of the adjacent phases.

15. The system of claim 1, wherein the temperature management device comprises an endovascular catheter.

16. The system of claim 1, wherein the temperature management device comprises a surface heat exchange device.

17. The system of claim 1, wherein the operations comprise:
receiving user input indicating selection of a single graph display mode; and
preparing a single graph for presentation at the display comprises graphing the treatment temperature versus time using a same temperature scale and a same time scale for all phases of the temperature data.

18. The system of claim 1, wherein compressing the respective timespan of the temperature data set of at least one phase of the plurality of phases comprises:
determining, for each respective phase of the plurality of phases, a length of time of the respective phase;
using the lengths of time of the plurality of phases, determining, for each respective phase, a respective time scale of a plurality of time scales for representing the temperature data set of the respective phase; and
for each respective phase of the at least one phase, reducing the temperature data set of the respective phase to fit the respective time scale.

* * * * *